United States Patent
Begic et al.

(10) Patent No.: US 8,267,363 B2
(45) Date of Patent: Sep. 18, 2012

(54) WALL STORAGE MOUNTING ARRANGEMENTS

(75) Inventors: Esnad Begic, Waterloo, IA (US); Franco F. Daino, Muskego, WI (US); Michael Edward Hay, Buckingham, IA (US); Gregory Jon Holcomb, Cedar Falls, IA (US); Mike Malich, Milwaukee, WI (US); Alan K. Mangrich, Cole Camp, MO (US); Rajesh R. Wadhwa, Portage, MI (US)

(73) Assignee: Waterloo Industries, Inc., Oak Creek, WI (US)

( * ) Notice: Subject to any disclaimer, the term of this patent is extended or adjusted under 35 U.S.C. 154(b) by 565 days.

(21) Appl. No.: 12/197,564

(22) Filed: Aug. 25, 2008

(65) Prior Publication Data

US 2009/0134290 A1    May 28, 2009

Related U.S. Application Data

(60) Provisional application No. 60/978,494, filed on Oct. 9, 2007, provisional application No. 61/034,604, filed on Mar. 7, 2008.

(51) Int. Cl.
*A47B 96/00* (2006.01)
(52) U.S. Cl. ......... 248/221.11; 248/222.13; 248/222.52; 211/86.01; 211/87.01; 211/4
(58) Field of Classification Search ............... 211/86.01, 211/87.01, 106.01, 57.1, 59.1, 4, 54.1; 248/220.21, 248/221.11, 222.13, 222.52; 403/322.1, 403/323, 348; 411/349, 549
See application file for complete search history.

(56) References Cited

U.S. PATENT DOCUMENTS

| 1,066,806 | A | | 7/1913 | Freud |
| 1,263,724 | A | | 4/1918 | Zagora |
| 1,800,387 | A | * | 4/1931 | Greist ........................... 248/307 |
| 2,312,985 | A | | 3/1943 | Bales |

(Continued)

FOREIGN PATENT DOCUMENTS

DE    8802103    *    6/1989

(Continued)

OTHER PUBLICATIONS

International Search Report and Written Opinion from International Application No. PCT/US08/74200, mailed Nov. 13, 2008.

(Continued)

*Primary Examiner* — Teri P. Luu
*Assistant Examiner* — Devin Barnett
(74) *Attorney, Agent, or Firm* — Calfee, Halter & Griswold LLP

(57) ABSTRACT

A slatwall mounting system includes a rail member and a mounting arrangement. The rail member includes longitudinally extending upper and lower edges, a longitudinally extending upper slot portion including a downward extending undercut a longitudinally extending lower slot portion including an upward extending undercut. The mounting arrangement includes a bracket member having a downward oriented hook portion and a mounting aperture, and a cam assembly having a mounting cam assembled with a user graspable cam driver, the cam and cam driver defining an annular groove for securing the cam assembly to the mounting aperture. The mounting cam is rotatable between a slatwall securing position for mounting engagement with the lower slot of the rail member, and a slatwall releasing position, in response to user manipulation of the cam driver.

4 Claims, 21 Drawing Sheets

U.S. PATENT DOCUMENTS

| | | | |
|---|---|---|---|
| 3,045,961 A | 7/1962 | Cygan | |
| 3,128,851 A * | 4/1964 | Deridder | 52/588.1 |
| 3,163,392 A | 12/1964 | Husted | |
| 3,273,847 A | 9/1966 | Berman | |
| 3,698,565 A | 10/1972 | Weber | |
| 3,891,172 A | 6/1975 | Einhorn | |
| 4,186,952 A * | 2/1980 | Glass | 292/202 |
| 4,204,602 A | 5/1980 | Dunchock | |
| 4,211,379 A | 7/1980 | Morgan et al. | |
| 4,325,239 A * | 4/1982 | Larson | 70/139 |
| 4,450,970 A | 5/1984 | Shepherd | |
| 4,508,231 A | 4/1985 | Honickman | |
| 4,509,648 A | 4/1985 | Govang et al. | |
| 4,531,331 A | 7/1985 | Itagaki | |
| 4,537,379 A | 8/1985 | Rhoades | |
| 4,572,381 A | 2/1986 | Breakey et al. | |
| 4,579,308 A | 4/1986 | Jensen | |
| 4,589,557 A | 5/1986 | Bollmann | |
| 4,591,058 A | 5/1986 | Amstutz et al. | |
| 4,607,753 A * | 8/1986 | Radek | 211/94.01 |
| 4,615,448 A | 10/1986 | Johnstonbaugh | |
| 4,618,192 A | 10/1986 | Kelley | |
| 4,629,076 A * | 12/1986 | Amstutz et al. | 211/94.01 |
| 4,660,339 A | 4/1987 | Paz | |
| 4,674,240 A * | 6/1987 | Strausheim | 52/36.4 |
| 4,678,151 A * | 7/1987 | Radek | 248/223.41 |
| 4,694,965 A | 9/1987 | Parnell | |
| 4,708,311 A | 11/1987 | Clausen et al. | |
| 4,718,562 A | 1/1988 | Winkler, Jr. | |
| 4,724,692 A | 2/1988 | Turin et al. | |
| 4,726,554 A * | 2/1988 | Sorrell | 248/222.51 |
| 4,730,738 A | 3/1988 | Bartus et al. | |
| 4,747,025 A | 5/1988 | Barton | |
| 4,750,624 A | 6/1988 | Baron | |
| 4,752,010 A | 6/1988 | Holztrager | |
| 4,787,768 A | 11/1988 | Lange | |
| 4,805,783 A | 2/1989 | Mayer | |
| 4,805,784 A * | 2/1989 | Solheim et al. | 211/94.01 |
| 4,805,863 A * | 2/1989 | Armstrong et al. | 248/243 |
| 4,809,479 A | 3/1989 | Tierno et al. | |
| 4,809,940 A | 3/1989 | Trestyn | |
| 4,825,601 A | 5/1989 | Halverson | |
| 4,829,402 A | 5/1989 | Gewebler et al. | |
| 4,830,203 A | 5/1989 | Ennis | |
| 4,882,868 A | 11/1989 | Fast | |
| 4,891,897 A | 1/1990 | Gieske et al. | |
| 4,899,894 A | 2/1990 | Crump | |
| 4,903,928 A | 2/1990 | Shell | |
| 4,909,398 A | 3/1990 | Santucci | |
| 4,919,279 A | 4/1990 | Crump | |
| 4,932,538 A | 6/1990 | Gambello | |
| 4,934,642 A | 6/1990 | Baron et al. | |
| 4,944,416 A | 7/1990 | Petersen et al. | |
| 4,961,295 A | 10/1990 | Kosch, Sr. et al. | |
| 4,971,206 A | 11/1990 | Lemmerman et al. | |
| 4,976,357 A | 12/1990 | Pearson | |
| 4,993,583 A | 2/1991 | Chasen | |
| 5,009,381 A | 4/1991 | Hermanson | |
| RE33,596 E * | 5/1991 | Ennis | 211/105.2 |
| 5,014,949 A | 5/1991 | Niven | |
| 5,018,323 A | 5/1991 | Clausen | |
| 5,022,621 A | 6/1991 | Quest | |
| 5,031,780 A | 7/1991 | Lemmerman et al. | |
| 5,038,946 A | 8/1991 | Tenser et al. | |
| 5,069,416 A | 12/1991 | Ennis | |
| 5,080,238 A | 1/1992 | Hochman | |
| 5,097,969 A | 3/1992 | Maxworthy | |
| 5,101,989 A | 4/1992 | Jones | |
| 5,109,993 A | 5/1992 | Hutchison | |
| 5,116,007 A | 5/1992 | Von Gunton et al. | |
| 5,116,138 A | 5/1992 | Macsenti et al. | |
| 5,121,578 A | 6/1992 | Holz | |
| 5,137,160 A | 8/1992 | Santucci | |
| 5,138,803 A | 8/1992 | Grossen | |
| 5,142,832 A | 9/1992 | Branham, Sr. et al. | |
| 5,188,246 A | 2/1993 | Maxworthy | |
| 5,197,703 A | 3/1993 | Pratolongo | |
| 5,199,775 A | 4/1993 | Morgan et al. | |
| 5,199,836 A * | 4/1993 | Gogarty | 411/84 |
| 5,221,013 A | 6/1993 | Santucci | |
| 5,222,608 A | 6/1993 | Eklof et al. | |
| 5,228,579 A | 7/1993 | Kaufman | |
| D338,076 S | 8/1993 | Current | |
| 5,236,344 A | 8/1993 | Baron | |
| 5,241,796 A | 9/1993 | Hellwig et al. | |
| 5,255,803 A | 10/1993 | Pavone et al. | |
| 5,269,161 A | 12/1993 | Stillwagon | |
| 5,275,027 A | 1/1994 | Eklof et al. | |
| 5,284,257 A | 2/1994 | Schum | |
| 5,299,509 A * | 4/1994 | Ballard | 108/182 |
| 5,356,104 A | 10/1994 | Rosenberg et al. | |
| 5,360,121 A | 11/1994 | Sothman | |
| 5,375,802 A | 12/1994 | Branham, II | |
| 5,390,462 A | 2/1995 | Kreiter | |
| 5,397,087 A | 3/1995 | Teece | |
| 5,409,120 A | 4/1995 | Miller et al. | |
| 5,412,912 A | 5/1995 | Alves | |
| 5,423,155 A | 6/1995 | Bauer | |
| 5,452,875 A | 9/1995 | Kern | |
| 5,477,645 A | 12/1995 | Bauer | |
| 5,477,969 A | 12/1995 | Beeskau et al. | |
| 5,484,067 A | 1/1996 | Sothman | |
| 5,485,933 A | 1/1996 | Crooymans | |
| 5,529,192 A | 6/1996 | Conen et al. | |
| 5,547,157 A | 8/1996 | Hsiao | |
| 5,547,271 A | 8/1996 | Rydell | |
| 5,582,376 A | 12/1996 | Thompson | |
| 5,655,674 A | 8/1997 | Holztrager | |
| 5,676,258 A | 10/1997 | Leyden et al. | |
| 5,700,293 A | 12/1997 | Rydell | |
| 5,711,115 A | 1/1998 | Wirt | |
| D393,907 S | 4/1998 | Current | |
| D393,909 S | 4/1998 | Current | |
| D395,089 S | 6/1998 | Current | |
| 5,775,521 A | 7/1998 | Tisbo | |
| 5,791,093 A | 8/1998 | Diamond | |
| D397,803 S | 9/1998 | Current | |
| D399,010 S | 9/1998 | Current | |
| D399,012 S | 9/1998 | Current | |
| D400,270 S | 10/1998 | Current | |
| 5,819,490 A | 10/1998 | Current | |
| D403,085 S * | 12/1998 | Current | D25/123 |
| D404,148 S | 1/1999 | Laskowski et al. | |
| 5,855,347 A | 1/1999 | Hollingsworth et al. | |
| 5,857,578 A | 1/1999 | Fishman | |
| 5,881,982 A | 3/1999 | Hollingsworth et al. | |
| D408,558 S | 4/1999 | Levy | |
| 5,890,607 A | 4/1999 | Maglione | |
| 5,899,344 A | 5/1999 | Current et al. | |
| 5,901,862 A | 5/1999 | Riga et al. | |
| 5,921,044 A | 7/1999 | Holztrager | |
| 5,941,026 A | 8/1999 | Eisenreich et al. | |
| 5,944,203 A | 8/1999 | Vlah et al. | |
| 5,944,294 A | 8/1999 | Baer | |
| D414,567 S | 9/1999 | Burt et al. | |
| 5,960,966 A | 10/1999 | Riga et al. | |
| 5,983,574 A | 11/1999 | Holztrager | |
| 5,988,576 A | 11/1999 | Ehrlich | |
| 6,003,685 A | 12/1999 | Malin | |
| 6,050,426 A | 4/2000 | Leurdijk | |
| D425,734 S | 5/2000 | Bauer | |
| 6,059,124 A | 5/2000 | Weck et al. | |
| 6,068,135 A | 5/2000 | Holztrager | |
| 6,070,741 A | 6/2000 | Bachman et al. | |
| 6,073,399 A | 6/2000 | Shipman et al. | |
| 6,105,793 A | 8/2000 | Riga | |
| 6,113,201 A | 9/2000 | Bauer | |
| 6,116,435 A | 9/2000 | Young | |
| 6,119,878 A * | 9/2000 | Zen | 211/94.01 |
| 6,131,866 A | 10/2000 | Kesinger | |
| 6,134,846 A | 10/2000 | Lamb | |
| 6,145,671 A | 11/2000 | Riga et al. | |
| 6,145,672 A | 11/2000 | Bachman et al. | |
| 6,161,705 A | 12/2000 | Riga et al. | |
| 6,164,467 A | 12/2000 | DePottey et al. | |
| 6,185,899 B1 | 2/2001 | De Niet | |
| 6,186,455 B1 | 2/2001 | Hollingsworth et al. | |

| | | |
|---|---|---|
| 6,199,705 B1 | 3/2001 | Portner |
| 6,206,212 B1 | 3/2001 | Loew |
| 6,220,461 B1 | 4/2001 | Dickinson |
| 6,234,330 B1 | 5/2001 | Gray |
| 6,264,148 B1 | 7/2001 | Chandler |
| 6,276,034 B1 | 8/2001 | Bachman et al. |
| 6,305,557 B1 | 10/2001 | Brooks |
| 6,311,854 B1 | 11/2001 | Anderson |
| 6,325,223 B1 | 12/2001 | Hannem |
| 6,334,540 B1 | 1/2002 | Plutsky |
| 6,343,701 B2 | 2/2002 | Riga et al. |
| 6,349,507 B1 | 2/2002 | Muellerleile |
| 6,349,909 B1 | 2/2002 | Zarrow et al. |
| 6,363,645 B1 | 4/2002 | Hunter |
| 6,393,877 B1 | 5/2002 | Church |
| 6,397,534 B1 | 6/2002 | Hager et al. |
| 6,412,648 B1 | 7/2002 | Woolnough et al. |
| 6,421,961 B1 | 7/2002 | Mallozzi |
| 6,443,320 B1 | 9/2002 | Herzog et al. |
| 6,467,637 B2 | 10/2002 | Riga |
| 6,474,478 B1 | 11/2002 | Huehner et al. |
| 6,491,172 B2 | 12/2002 | Chance et al. |
| D471,431 S | 3/2003 | Valiulis et al. |
| D471,993 S | 3/2003 | Holztrager |
| D473,664 S | 4/2003 | Perkins et al. |
| 6,547,086 B1 | 4/2003 | Harvey |
| 6,578,498 B1 | 6/2003 | Draudt et al. |
| 6,604,637 B2 | 8/2003 | Lane et al. |
| 6,612,448 B2 | 9/2003 | Plutsky |
| 6,622,979 B2 | 9/2003 | Valiulis |
| D482,802 S | 11/2003 | Yates, Jr. |
| D482,803 S | 11/2003 | Yates, Jr. |
| 6,644,608 B1 | 11/2003 | Begg |
| 6,659,291 B2 | 12/2003 | Huehner et al. |
| 6,669,154 B1 | 12/2003 | Remmers |
| 6,676,176 B1 * | 1/2004 | Quandt ................. 292/202 |
| 6,681,510 B1 | 1/2004 | Salatin et al. |
| 6,695,154 B2 | 2/2004 | Jacobs |
| 6,722,619 B2 | 4/2004 | Valiulis et al. |
| D489,465 S | 5/2004 | Allsopp |
| 6,749,161 B1 | 6/2004 | Will et al. |
| 6,763,957 B1 * | 7/2004 | Mullerleile ............... 211/94.01 |
| 6,772,890 B2 | 8/2004 | Campbell et al. |
| 6,811,043 B2 * | 11/2004 | Perkins et al. ............. 211/94.01 |
| 6,837,384 B2 | 1/2005 | Secondino |
| D502,778 S | 3/2005 | Fischer |
| 6,874,825 B1 * | 4/2005 | Rauner ................... 292/61 |
| 6,877,616 B2 | 4/2005 | Plutsky |
| 6,877,617 B2 | 4/2005 | Lane et al. |
| 6,889,855 B2 | 5/2005 | Nagel |
| D507,060 S | 7/2005 | Fischer |
| D507,355 S | 7/2005 | Fischer |
| 6,926,160 B2 | 8/2005 | Perkins et al. |
| 6,929,131 B1 | 8/2005 | Landi |
| 6,945,414 B1 | 9/2005 | Stevens et al. |
| 6,953,176 B2 | 10/2005 | Remmers |
| D511,390 S | 11/2005 | Schuberth |
| D511,581 S | 11/2005 | Holztrager |
| 6,971,614 B2 | 12/2005 | Fischer et al. |
| D513,535 S | 1/2006 | Fischer |
| 6,986,489 B2 | 1/2006 | Oddsen, Jr. |
| 7,007,810 B2 | 3/2006 | Huehner et al. |
| 7,021,814 B2 * | 4/2006 | Berardi ................... 362/650 |
| D520,148 S | 5/2006 | Kendall et al. |
| 7,036,196 B2 | 5/2006 | Salatin et al. |
| 7,055,703 B2 | 6/2006 | Perkins et al. |
| 7,086,542 B2 | 8/2006 | Tomonari et al. |
| 7,086,543 B2 | 8/2006 | Remmers |
| 7,093,726 B1 | 8/2006 | Holztrager |
| 7,096,560 B2 | 8/2006 | Oddsen, Jr. |
| 7,104,023 B1 | 9/2006 | Holztrager |
| 7,107,222 B1 | 9/2006 | Riga |
| D532,120 S | 11/2006 | Holztrager |
| 7,131,542 B2 | 11/2006 | Sedon et al. |
| D533,283 S | 12/2006 | Holztrager |
| 7,147,115 B2 | 12/2006 | Perkins et al. |
| 7,152,748 B2 | 12/2006 | Vosbikian |
| 7,175,034 B2 | 2/2007 | Nook et al. |
| 7,178,678 B2 | 2/2007 | Mansfield et al. |
| 7,198,159 B2 | 4/2007 | Fischer |
| 7,204,375 B2 | 4/2007 | Paiste et al. |
| 7,228,977 B2 | 6/2007 | Perkins et al. |
| D551,470 S | 9/2007 | Loew |
| D551,781 S * | 9/2007 | Abdullah ................... D25/123 |
| 2003/0001058 A1 | 1/2003 | Oddsen, Jr. |
| 2003/0057336 A1 | 3/2003 | Hochman |
| 2003/0189393 A1 | 10/2003 | Draudt et al. |
| 2003/0230685 A1 | 12/2003 | Valiulis et al. |
| 2004/0031890 A1 | 2/2004 | Haluzak |
| 2004/0060879 A1 | 4/2004 | Cohen |
| 2004/0111980 A1 | 6/2004 | Kosch |
| 2004/0118791 A1 * | 6/2004 | Rimback et al. ............. 211/34 |
| 2004/0159067 A1 | 8/2004 | Perkins et al. |
| 2004/0159755 A1 | 8/2004 | Valiulis et al. |
| 2004/0222176 A1 | 11/2004 | Campbell et al. |
| 2004/0256338 A1 | 12/2004 | McGarry et al. |
| 2005/0000926 A1 | 1/2005 | Bowers et al. |
| 2005/0006539 A1 * | 1/2005 | Fischer et al. ........... 248/220.42 |
| 2005/0035074 A1 | 2/2005 | McGarry |
| 2005/0055938 A1 | 3/2005 | Secondino |
| 2005/0189460 A1 | 9/2005 | Oddsen, Jr. |
| 2005/0193641 A1 | 9/2005 | Fischer |
| 2005/0236544 A1 | 10/2005 | Mancino et al. |
| 2005/0241251 A1 | 11/2005 | Browe et al. |
| 2005/0247653 A1 * | 11/2005 | Brooks ................... 211/94.01 |
| 2005/0279894 A1 | 12/2005 | Sedon et al. |
| 2006/0011568 A1 | 1/2006 | Remmers et al. |
| 2006/0054341 A1 | 3/2006 | Auray et al. |
| 2006/0091093 A1 | 5/2006 | Armari |
| 2006/0091094 A1 | 5/2006 | Schuberth |
| 2006/0145002 A1 | 7/2006 | Van Loon |
| 2006/0157431 A1 | 7/2006 | Nagelski et al. |
| 2006/0175274 A1 | 8/2006 | Yang |
| 2006/0180561 A1 | 8/2006 | Wisnoski et al. |
| 2006/0266901 A1 * | 11/2006 | Tallman ................... 248/220.43 |
| 2006/0278589 A1 | 12/2006 | Peponis et al. |
| 2007/0012636 A1 | 1/2007 | Wisnoski et al. |
| 2007/0012832 A1 | 1/2007 | Ottens et al. |
| 2007/0039907 A1 | 2/2007 | Zandt |
| 2007/0056921 A1 | 3/2007 | Lo |
| 2007/0062890 A1 | 3/2007 | Nagelski et al. |
| 2007/0079561 A1 * | 4/2007 | Hopkins ................... 52/36.5 |
| 2007/0119797 A1 | 5/2007 | Mansfield et al. |
| 2007/0181517 A1 * | 8/2007 | Perkins et al. ............. 211/94.01 |
| 2009/0014401 A1 * | 1/2009 | Tallman ................... 211/106.01 |

FOREIGN PATENT DOCUMENTS

DE 202006011519 11/2006

OTHER PUBLICATIONS

Search Report from European Patent Application No. 08798625.3 dated Jul. 20, 2011.

International Search Report and Written Opinion from International Application No. PCT/US2011/37272, mailed Dec. 28, 2011.

* cited by examiner

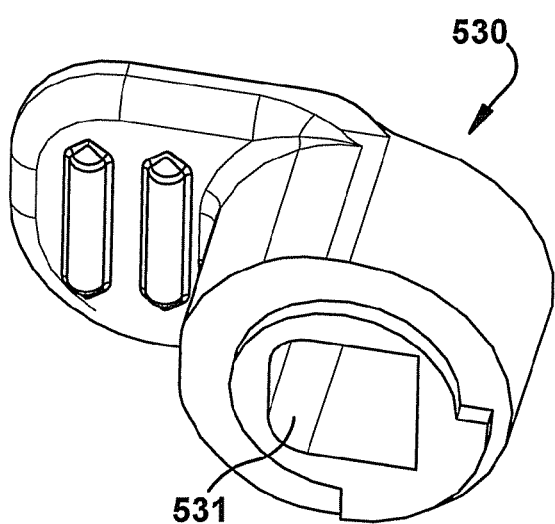
Fig. 15A
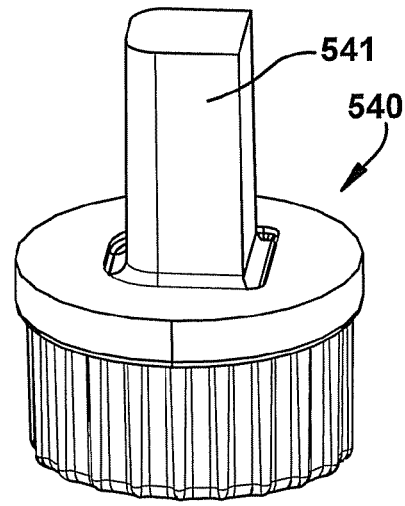
Fig. 15B
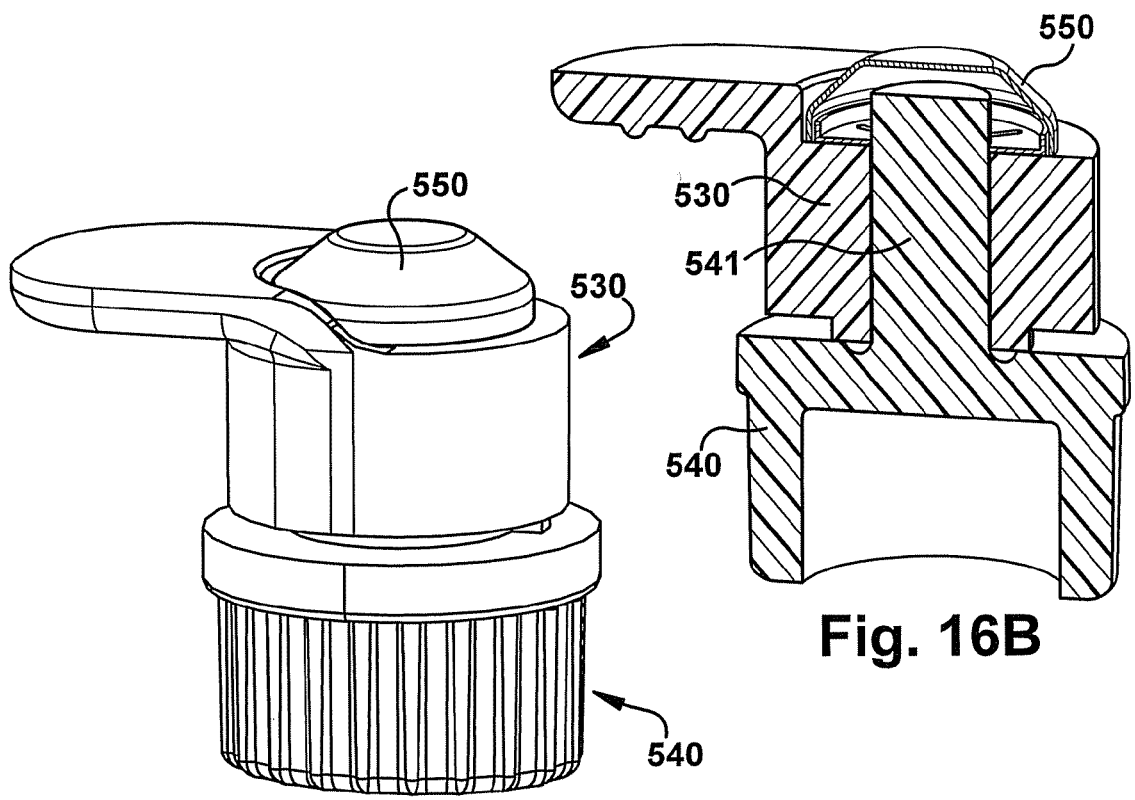
Fig. 16A
Fig. 16B

Fig. 22A  Fig. 22B  Fig. 22C  Fig. 22D

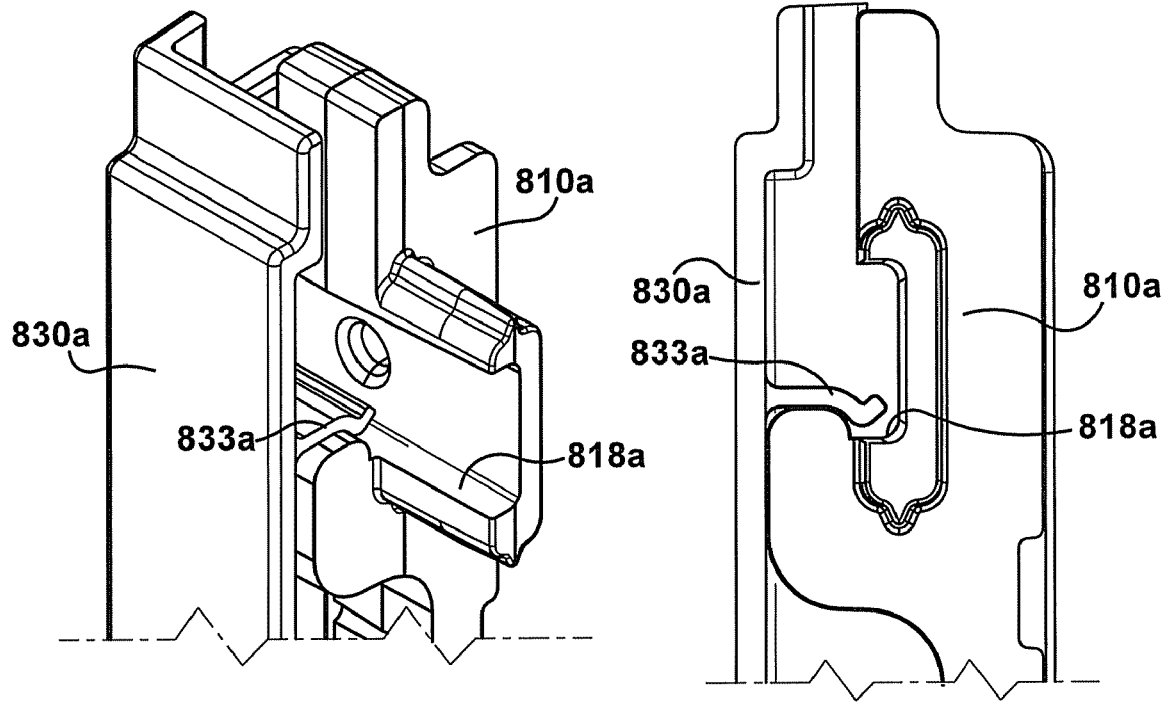

WALL STORAGE MOUNTING ARRANGEMENTS

CROSS REFERENCE TO RELATED APPLICATIONS

This application claims the benefit of both U.S. Provisional Patent Application Ser. No. 60/978,494, entitled WALL STORAGE MOUNTING ARRANGEMENT and filed Oct. 9, 2007, and U.S. Provisional Patent Application Ser. No. 61/034,604, entitled WALL STORAGE MOUNTING ARRANGEMENTS and filed Mar. 7, 2008, the entire disclosures of both of which are incorporated herein by reference, to the extent that they are not conflicting with the present application.

BACKGROUND

Use of available wall space for storage of items is often desirable, for example, where easy access to or visibility of these items is required, and/or where floor space is limited, such as for example, in a retail setting or in a residential garage. While some items may be stored or retained on a wall by a conventional peg board and hook arrangement, slatwall panels may also be used for more versatile storage options. A conventional slatwall panel includes one or more horizontal slots configured to receive hooks, fasteners, or other such components, for example, for direct retention of an item (e.g., a handtool or article for retail sale). Additionally or alternatively, hooks or fasteners may be affixed to storage accessories, such as, for example, bins, cabinets, boxes, hangers, or shelves, for storage of one or more items.

SUMMARY

The present application contemplates a system for mounting one or more items to a wall surface by securing one or more slatwall rail members to the wall surface, and selectively attaching one or more mounting bracket assemblies to the rail members, for example, for direct or indirect attachment of an item or items to the bracket assemblies. According to an inventive aspect of the present application, a portion of a bracket (for example, a retaining portion or hook portion) may loosely secure the bracket to a slot in the rail member, while a user operable cam member may be provided to more securely attach the bracket assembly to the rail member.

Accordingly, in one embodiment, a slatwall mounting system includes a rail member and a mounting arrangement. The rail member includes longitudinally extending upper and lower edges, a longitudinally extending upper slot portion including a downward extending undercut and a longitudinally extending lower slot portion including an upward extending undercut. The mounting arrangement includes a bracket member having a downward oriented hook portion and a mounting aperture, and a cam assembly having a mounting cam assembled with a user graspable cam driver, the cam and cam driver defining an annular groove for securing the cam assembly to the mounting aperture. The mounting cam is rotatable between a slatwall securing position for mounting engagement with the lower slot of the rail member, and a slatwall releasing position, in response to user manipulation of the cam driver.

According to another inventive aspect of the present application, a slatwall mounting system may be provided with rail members configured to interlock vertically to provide multiple vertical mounting positions for attachment of mounting bracket assemblies or other mounting hardware. In one embodiment, a slatwall rail comprising includes longitudinally extending upper and lower edges, with one of the upper and lower edges including a longitudinally extending tongue portion, and the other of the upper and lower edges including a longitudinally extending groove portion. The groove portion may be sized to closely receive an interlocking member substantially matching the tongue portion of the slatwall rail (for example, for vertically stacking identical rail members). In one such embodiment, the rail further includes a recessed portion extending inward from the groove portion to closely receive a tab portion significantly thinner in cross section than the tongue portion. In one example, this recessed portion may be sized to receive an upper or lower edge of a peg board.

According to still another inventive aspect of the present application, a slatwall mounting system may be provided with a mounting member configured to be assembled to a rail member for securing the rail member to a wall surface, and/or to another rail member. In one such embodiment, a mounting member includes laterally extending tab portions sized to be received in slot portions of a rail member. The mounting member may be configured to mount the rail member to a wall surface (for example, by providing one or more mounting apertures), and/or configured to mount the rail member to another rail member (for example, by providing opposed tab portions sized to be received in slot portions of a second rail member for side by side assembly of the two rail members).

BRIEF DESCRIPTION OF THE DRAWINGS

Features and advantages of the invention will become apparent from the following detailed description made with reference to the accompanying drawings, wherein:

FIG. 15A illustrates a side perspective view of a cam driver having a keyed shaft for assembly with a cam;

FIG. 15B illustrates a cam for assembly with the cam driver of FIG. 15A;

FIG. 16A illustrates a side perspective view of a cam secured to a cam driver with a fastener;

FIG. 16B illustrates a side cross-sectional view of the cam and cam driver assembly of FIG. 16A;

FIG. 22A illustrates an outer perspective view of a left cap member;

FIG. 22B illustrates an outer perspective view of a right cap member;

FIG. 22C illustrates an inner perspective view of the left cap member of FIG. 22A;

FIG. 22D illustrates an inner perspective view of the right cap member of FIG. 22B;

FIG. 23D illustrates a perspective view of a left cap member aligned for assembly with the left wall mount member of FIG. 23A; and FIG. 23E illustrates an end view of the cap member and wall mount member of FIG. 23D.

DETAILED DESCRIPTION OF THE INVENTION

This Detailed Description of the Invention merely describes embodiments of the invention and is not intended to limit the scope of the claims in any way. Indeed, the invention as claimed is broader than and unlimited by the embodiments described herein, and the terms used have their full ordinary meaning.

The present application relates to wall storage mounting arrangements in which a slatwall, configured to be mounted to a wall or other surface, includes one or more slots for receiving hooks, fasteners, or other such hardware for retaining an item, such as, for example, a hand tool, or a storage accessory, such as, for example, a bin or cabinet. The slots of a slatwall may include one or more laterally extending undercuts or recesses configured to receive laterally extending portions of hooks, fasteners, brackets or other hardware, such that when the hardware receives and or supports an item to be retained on the slatwall, engagement of the laterally extending portion of the hardware with a portion of the slatwall secures the hardware and the item to the slatwall to prevent the hardware and item from separating from or falling off of the slatwall.

Figure 1A:
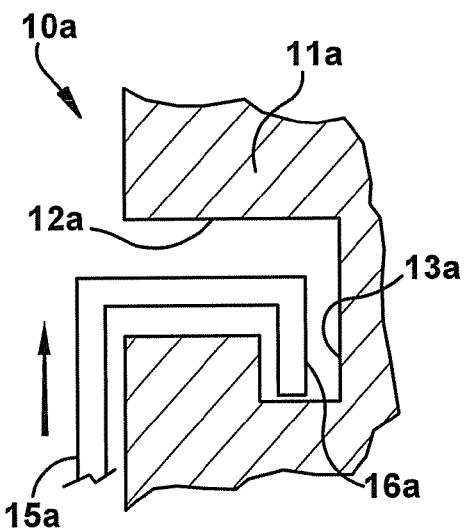
FIG. 1A illustrates a partial side schematic view of a wall storage mounting arrangement.
Figure 1B:
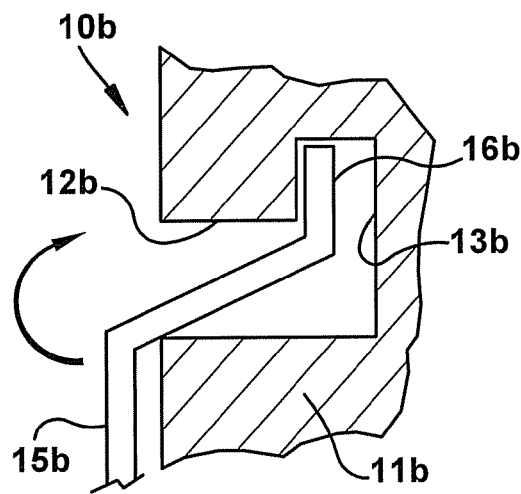
FIG. 1B illustrates a partial side schematic view of another wall storage mounting arrangement.
Figure 1C:
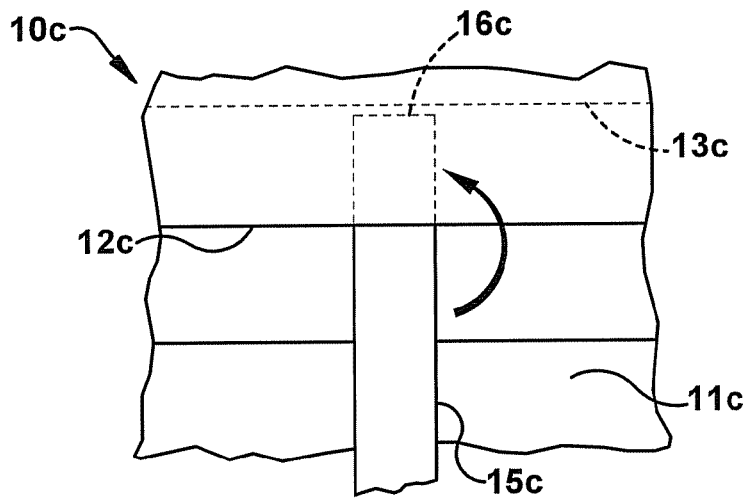
FIG. 1C illustrates a partial front schematic view of another wall storage mounting arrangement.

Schematic examples of some wall storage mounting arrangements 10a, 10b, 10c are illustrated in FIGS. 1A-1C, respectively, which include mounting members 15a, 15b, 15c (such as, for example, brackets or other such hardware) having retaining portions 16a, 16b, 16c (such as, for example, hooks, tabs, and/or flanges, or other such projections) that may be inserted into slots 12a, 12b, 12c in a slatwall 11a, 11b, 11c through the front openings of the slots, and then slid (FIG. 1A), pivoted (FIG. 1B), or rotated (FIG. 1C) into the undercut 13a, 13b, 13c of the slot for retention of the mounting member. While these arrangements may loosely support and secure the hardware and retained items against downward forces (e.g., the weight of the retained item), the hardware and retained item may be inadvertently separated from the slatwall by upward, outward, and/or lateral forces applied to the hardware and/or retained item, for example, due to bumping the item and/or hardware or during retrieval of an item from the hardware or storage accessory. The slatwall and mounting hardware may be provided with holes (not shown) configured to align and receive fasteners to more securely affix the hardware to the slatwall. However, such an arrangement may limit the positions at which the hardware may be mounted, and may make adjustments to the wall storage arrangement more inconvenient or time consuming.

Figure 2A:
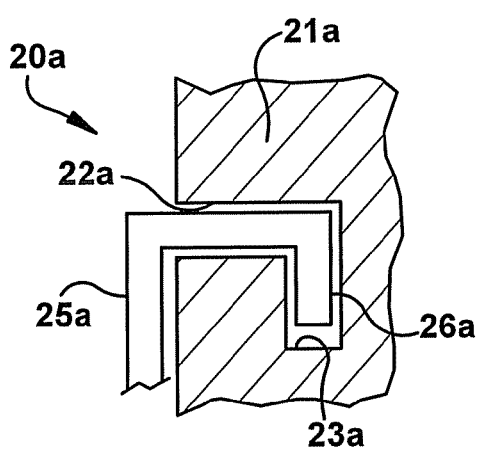
FIG. 2A illustrates a partial side schematic of yet another wall storage mounting arrangement.
Figure 2B:
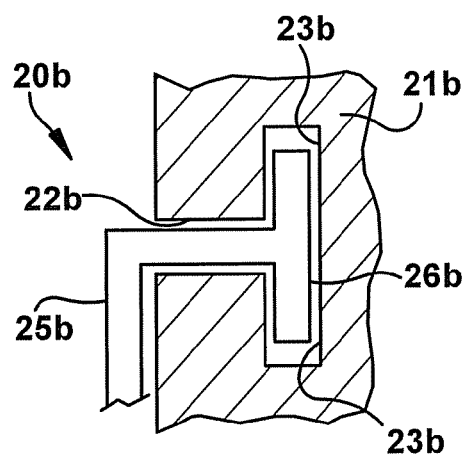
FIG. 2B illustrates a partial side schematic view of still another wall storage mounting arrangement.

In another embodiment, shown, for example, in FIGS. 2A and 2B, wall storage mounting arrangements 20a, 20b may include mounting members 25a, 25b provided with laterally extending portions 26a, 26b sized or shaped such that they cannot be inserted into, or removed from, the front openings of the slots 22a, 22b, thereby preventing the mounting member 25a, 25b from being inadvertently separated from the front of the slatwall 21a, 21b. To remove the mounting member from the slatwall, a user would have to slide the mounting member 25a, 25b along the length of the slot 22a, 22b and out of the slot, which may require removal of other hardware assembled with the same slot. To assemble the mounting member 25a, 25b with the slatwall 21a, 21b, the user would insert the laterally extending portions 26a, 26b into the undercuts 23a, 23b at an end of the slot and slide the mounting member to a desired position, which may also require removal of other hardware assembled with the same slot 22a, 22b.

Figure 3:
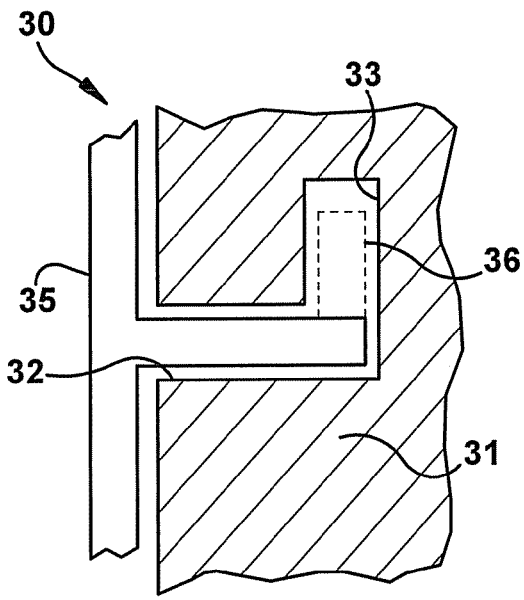
FIG. 3 illustrates a partial side schematic view of a wall storage mounting arrangement with a movable retaining member.

According to an inventive aspect of the present application, as schematically shown, for example, in FIG. 3, a wall storage mounting arrangement 30 may include a mounting member 35 (such as, for example, a bracket or other such hardware) having a movable retaining member (shown in phantom at 36) configured to be moved between a mounting member retaining position and a mounting member releasing position. In the retaining position, a portion of the retaining member engages a recess or undercut 33 in the slot 32 of the slatwall 31, such that withdrawal of the retaining member 36 through the front opening of the slot 32 is prohibited. In the releasing position, the retaining member 36 is moved or retracted out of engagement with the undercut 33 in the slot 32, thereby permitting withdrawal of the retaining member 36 from the slot 32, and separation of the mounting member 35 from the slatwall 31.

Figure 4:
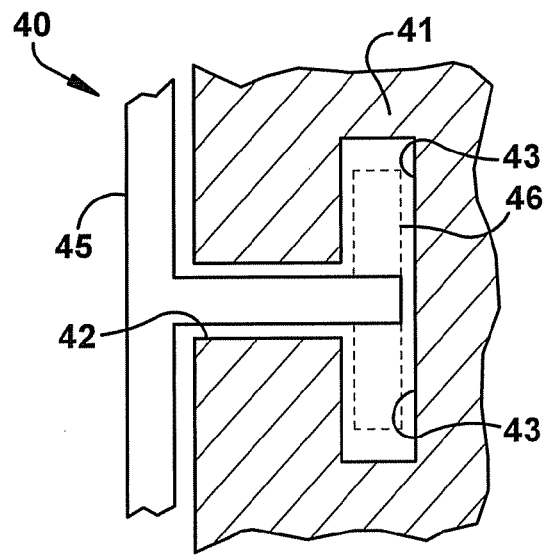
FIG. 4 illustrates a partial side schematic view of another wall storage mounting arrangement with a movable retaining member.
Figure 5A:
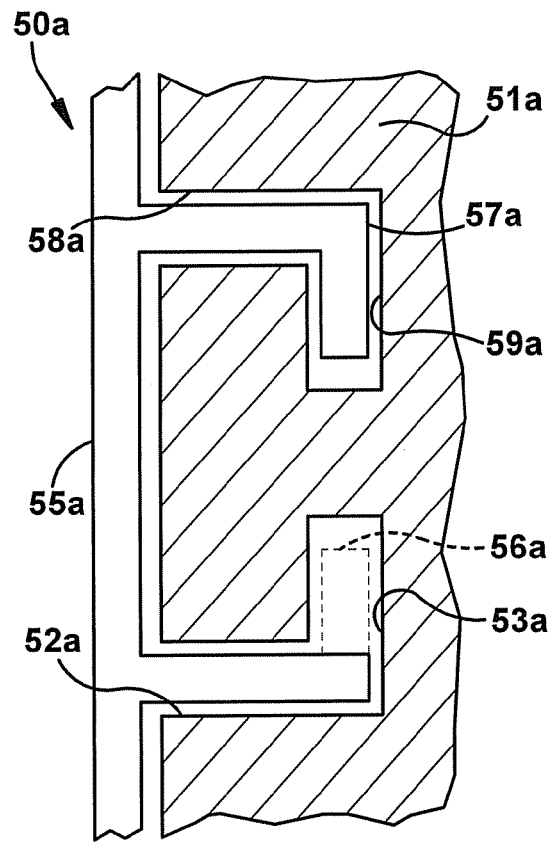
FIG. 5A illustrates a partial side schematic view of a wall storage mounting arrangement with a fixed retaining portion and a movable retaining member.
Figure 5B:
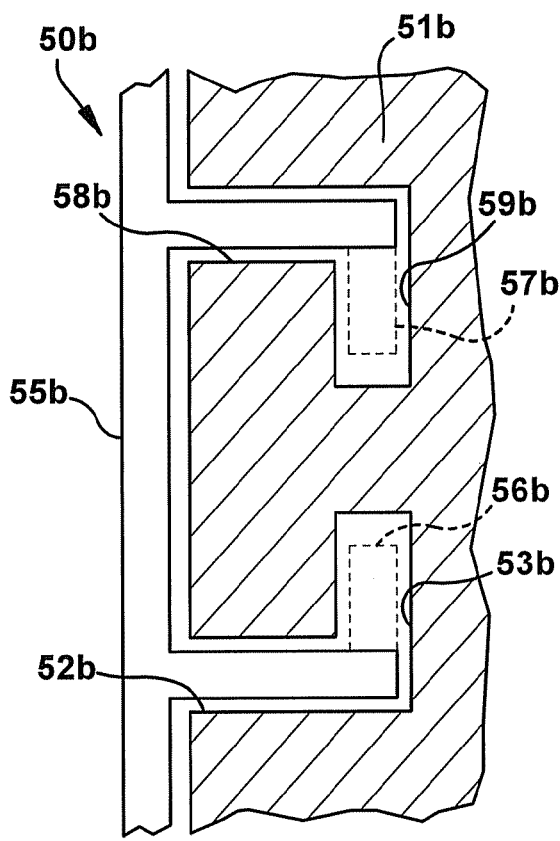
FIG. 5B illustrates a partial side schematic view of a wall storage mounting arrangement with first and second movable retaining members.

The movable retaining member 36 may be configured to be moved in and out of engagement with a single undercut 33, as shown in FIG. 3. In another embodiment, as shown in FIG. 4, a movable retaining member 46 may be moved in and out of engagement with multiple undercuts 43. Further, to provide additional support for a stored item or storage accessory, as shown in FIGS. 5A and 5B, a mounting member 55a, 55b having a movable retaining member 56a, 56b may include a second retaining portion 57a, 57b configured to engage an undercut 59a, 59b, of a second slot 58a, 58b. As shown in FIG. 5A, the second retaining portion 57a may include one or more fixed laterally extending projections (for example, hooks, tabs, or flanges). Additionally or alternatively, the second retaining portion 57b may include a second movable retaining member configured to be moved between a mounting member retaining position and a mounting member releasing position.

Many different mechanisms may be utilized to provide for movement of a movable retaining member between mounting member retaining and releasing positions, including, for example, sliding, pivoting, rotating, or extending mechanisms. In one embodiment, a movable retaining member is configured to be manipulable (either directly or indirectly) from an outer or front side of the mounting member, for example, between mounting member retaining and releasing positions.

Figure 6A:
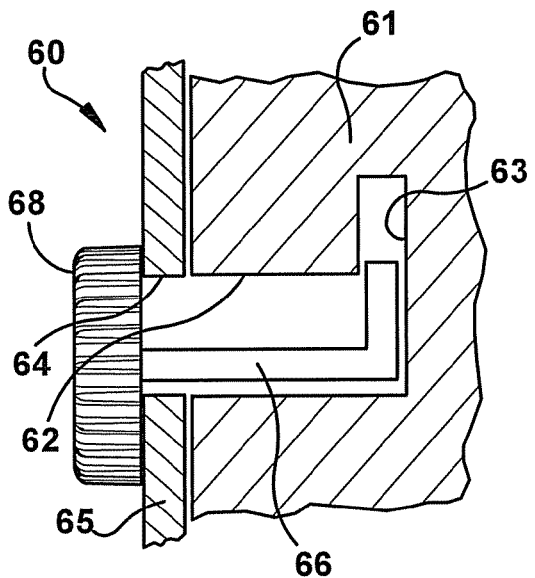
FIG. 6A illustrates a partial side schematic view of a wall storage mounting arrangement with a slidable retaining member in a mounting member releasing position.
Figure 6B:
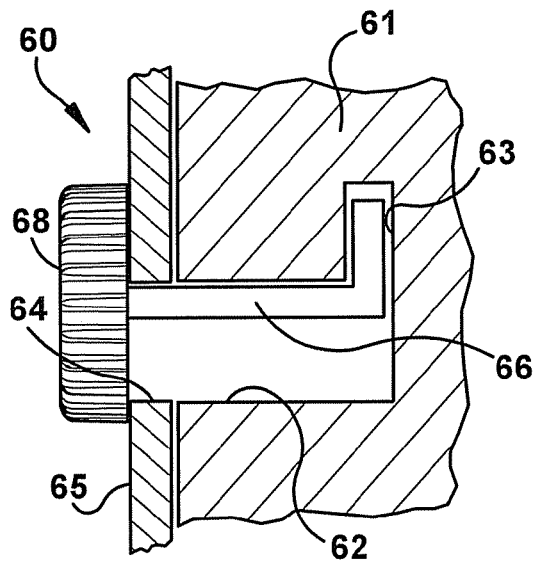
FIG. 6B illustrates a partial side schematic view of the wall storage mounting arrangement of FIG. 6A, with the slidable retaining member in a mounting member retaining position.

FIGS. 6A and 6B schematically illustrate an exemplary embodiment of a wall storage mounting arrangement 60 in which a mounting member 65 is secured to a slatwall panel 61 by a movable retaining member 66 that is slidable within a slot 64 of the mounting member 65 between a mounting member releasing position (FIG. 6A) and a mounting member retaining position (FIG. 6B) for engagement of the retaining member 66 with an undercut 63 in the slot 62 of the slatwall panel 61. A user manipulable slider portion 68 may be connected with the retaining member 66 for selective movement of the retaining member 66 (either by hand or through use of a tool) between the releasing and retaining positions. In an exemplary embodiment, the mounting member may include a second retaining portion (such as, for example, the second retaining portion 57a of the embodiment of FIG. 5A), which may provide all or most of the weight bearing support for the mounting member and any retained items or accessories, such that the movable retaining member 66 is not subjected to excessive loads. Many different configurations may be used to hold the retaining member 66 in the retaining position, including, for example, press fit, interference fit, or detent engagement between the mounting member 65 and the slider 68, between the retaining member 66 and the mounting member slot 64, or between the retaining member 66 and the undercut 63. Other locking, spring biasing, or latching mechanisms may also be used.

Figure 7A:
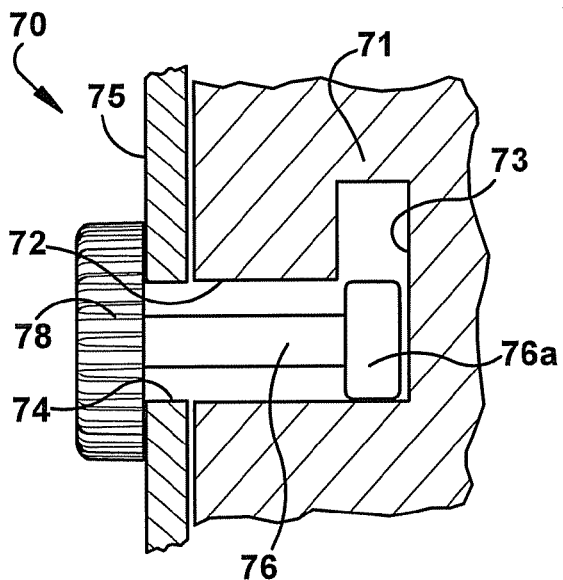
FIG. 7A illustrates a partial side schematic view of a wall storage mounting arrangement with a rotatable retaining member in a mounting member releasing position.
Figure 7B:
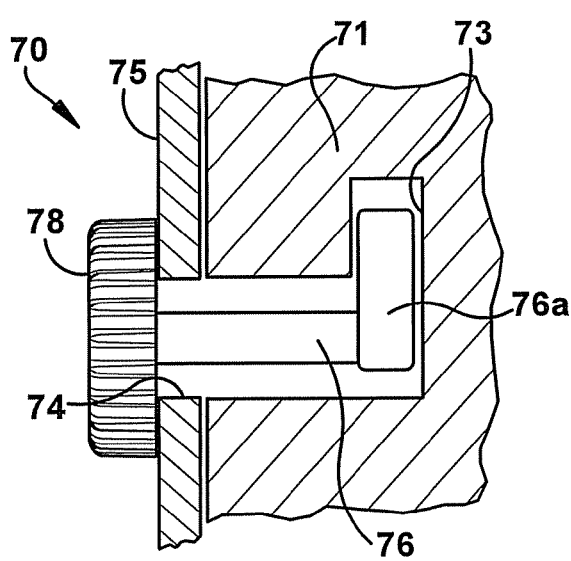
FIG. 7B illustrates a partial side schematic view of the wall storage mounting arrangement of FIG. 7A, with the rotatable retaining member in a mounting member retaining position.

FIGS. 7A and 7B schematically illustrate another exemplary embodiment of a wall storage mounting arrangement 70 in which a mounting member 75 is secured to a slatwall panel 71 by a movable retaining member 76 that is rotatable within an opening 74 of the mounting member 75 between a mounting member releasing position (FIG. 7A) and a mounting member retaining position (FIG. 7B) for engagement of the retaining member 76 with an undercut 73 in the slot 72 of the slatwall panel 71. The retaining member may include an elongated or oblong end portion 76a that is disengaged or withdrawn from the undercut 73 when the retaining member 76 is in the releasing rotational position, and engaged with or received in the undercut 73 when the retaining member 76 is in the retaining rotational position. A user manipulable knob portion 78 may be connected with the retaining member 76 for selective rotation of the retaining member 76 (either by hand or through use of a tool) between the releasing and retaining positions. In an exemplary embodiment, the mounting member may include a second retaining portion (such as, for example, the second retaining portion 57a of the embodiment of FIG. 5A), which may provide all or most of the weight bearing support for the mounting member and any retained items or accessories, such that the movable retaining member 76 is not subjected to excessive loads. Many different configurations may be used to hold the retaining member 76 in the retaining position, including, for example, press fit, interference fit, or detent engagement between the mounting member 75 and the knob 78, between the retaining member 76 and the mounting member opening 74, or between the retaining member 76 and the undercut 73. Other locking, spring biasing, or latching mechanisms may also be used.

Figure 8A:
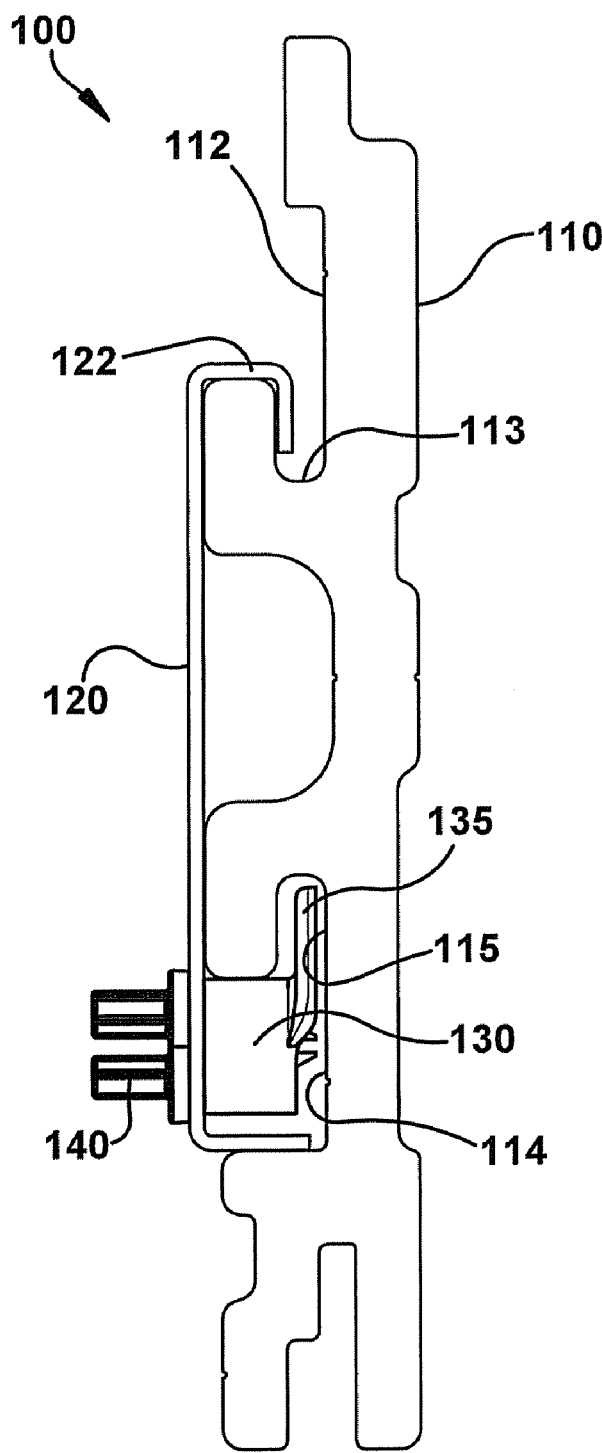
FIG. 8A illustrates a side view of a wall storage mounting arrangement.
Figure 8B:
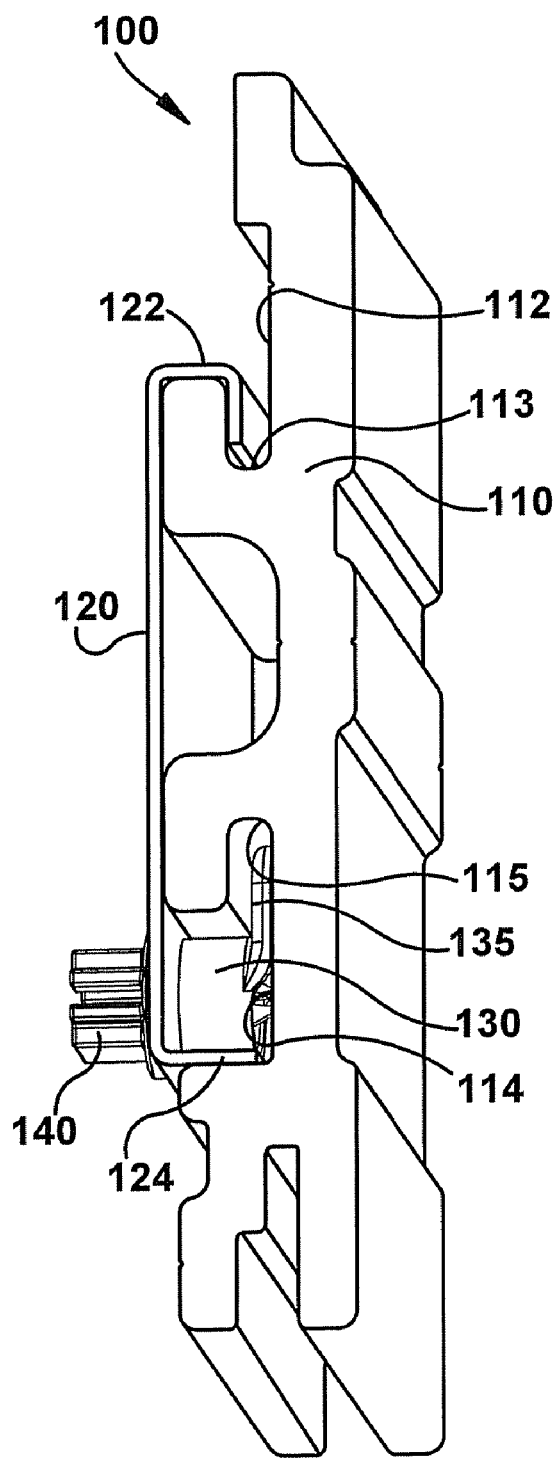
FIG. 8B illustrates a side perspective view of the wall storage mounting arrangement of FIG. 8A.
Figure 8C:
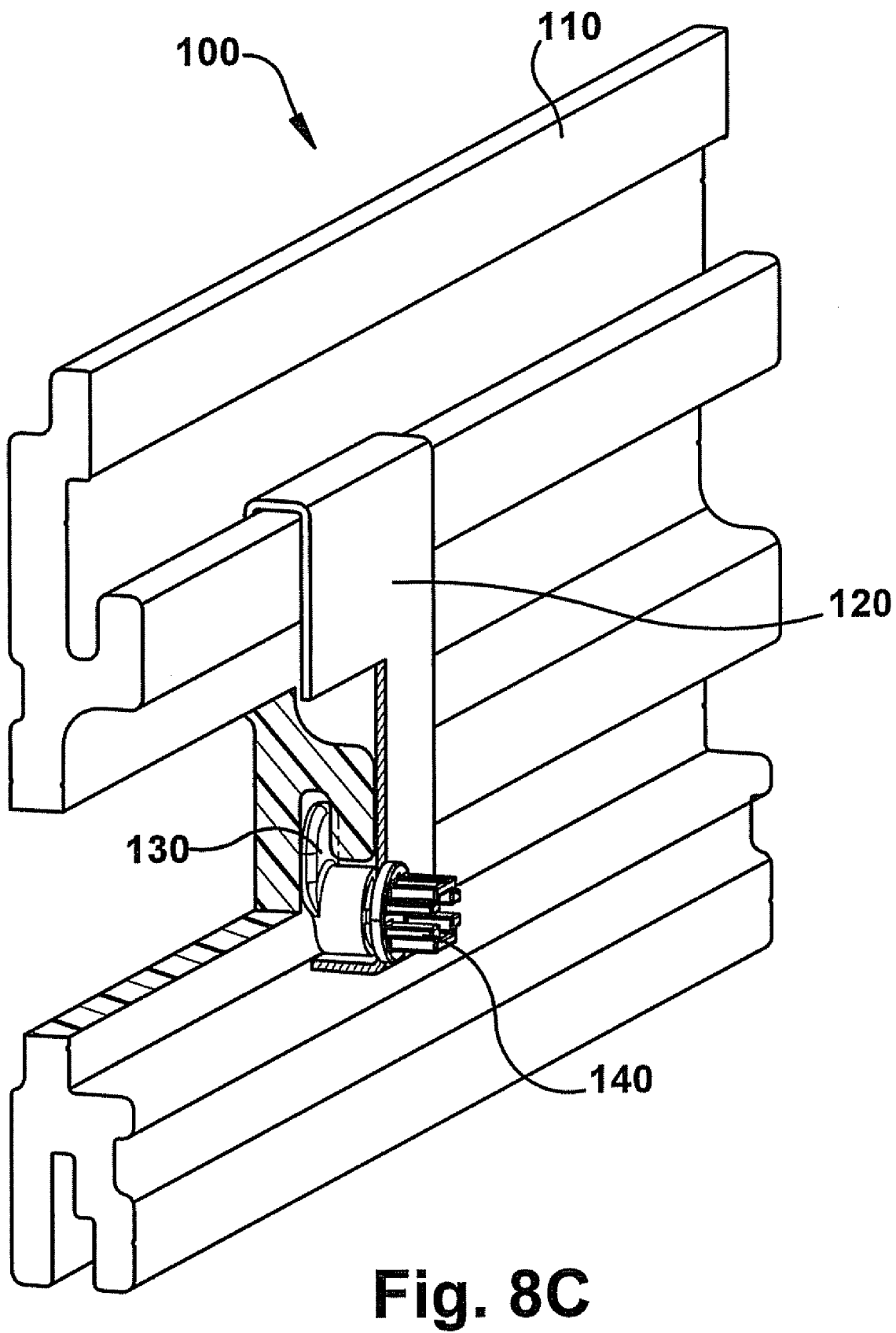
FIG. 8C illustrates a partially sectioned front perspective view of the wall storage mounting arrangement of FIG. 8A.
Figure 10:
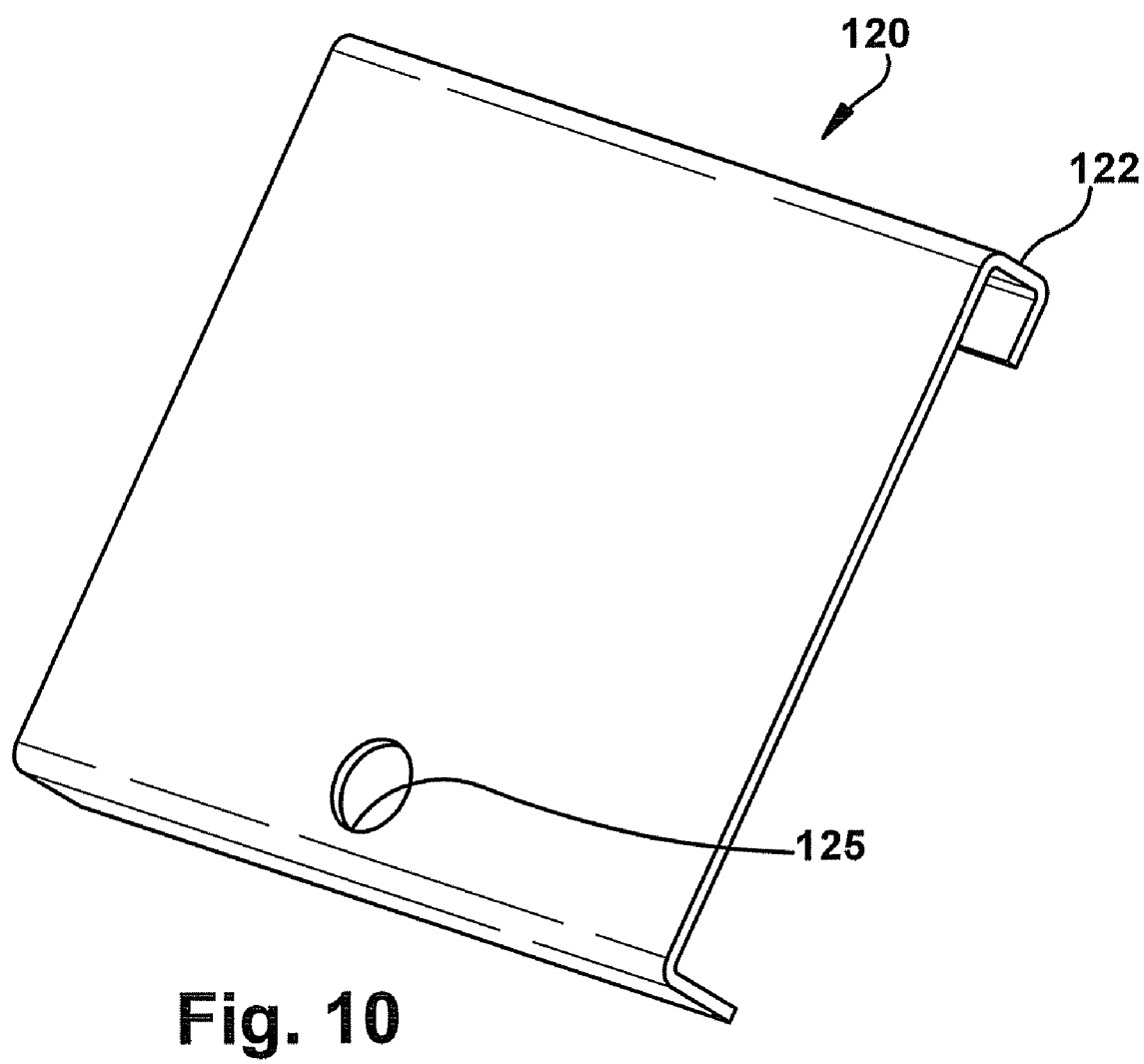
FIG. 10 illustrates a perspective view of the bracket of the wall storage mounting arrangement of FIG. 9A.

FIGS. 8A, 8B, and 8C illustrate an exemplary wall storage mounting arrangement 100 in which a slatwall rail member 110 (which may form all or part of a slatwall panel for mounting to a wall or other surface) is configured to receive one or more mounting members or brackets 120 secured to a first slot 112 in the rail member 110 by a first retaining portion 122 of the bracket 120. While different types of retaining portions and slots may be used, in the illustrated embodiment a hook or J-shaped retaining portion 122 is sized to engage a downward oriented undercut 113 of the first slot 112. The bracket 120 is further secured to a second slot 114 in the rail member 110 by a movable retaining member or rotatable cam 130 that is rotatable through a mounting aperture or opening 125 in the bracket 120 (see FIG. 10) between a bracket releasing position and a bracket retaining position. In the bracket retaining position, as shown in FIG. 8A, a laterally extending projection 135 of the cam 130 engages or is received in an upward oriented undercut 115 in the second slot 114. As shown, a portion of the cam member 130 may be sized and/or positioned to provide a press fit against a surface of the slot 114, thereby cinching or tightening the bracket 120 against the rail member 110 when the cam 130 is in the bracket retaining position. The bracket 120 is shown (see FIGS. 8A and 8B) with a lower leg portion 124 that projects into the second slot 114, and may, for example, block access to the cam 130. In other embodiments, the bracket 120 may be provided without this leg portion, or with a different shaped end portion. Further, while the bracket may be provided in any suitable material, in one embodiment, the bracket 120 is manufactured from cold rolled steel.

Figure 9A:
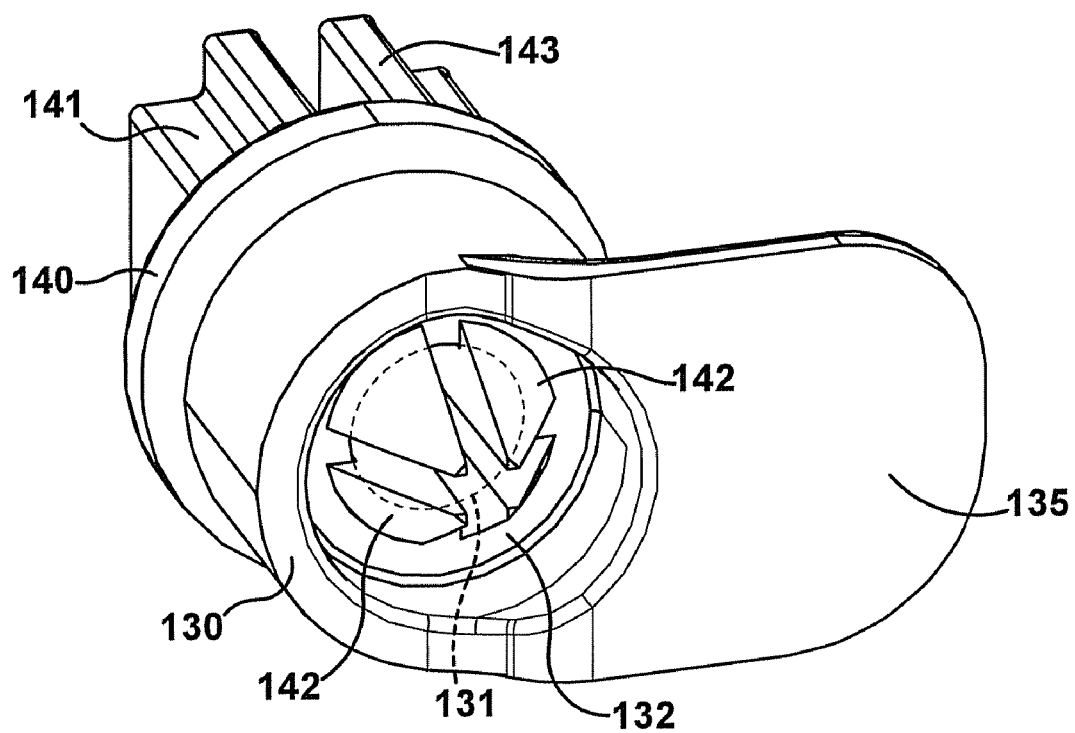
FIG. 9A illustrates a rear perspective view of the cam and cam driver assembly of the wall storage mounting arrangement of FIG. 8A.
Figure 9B:
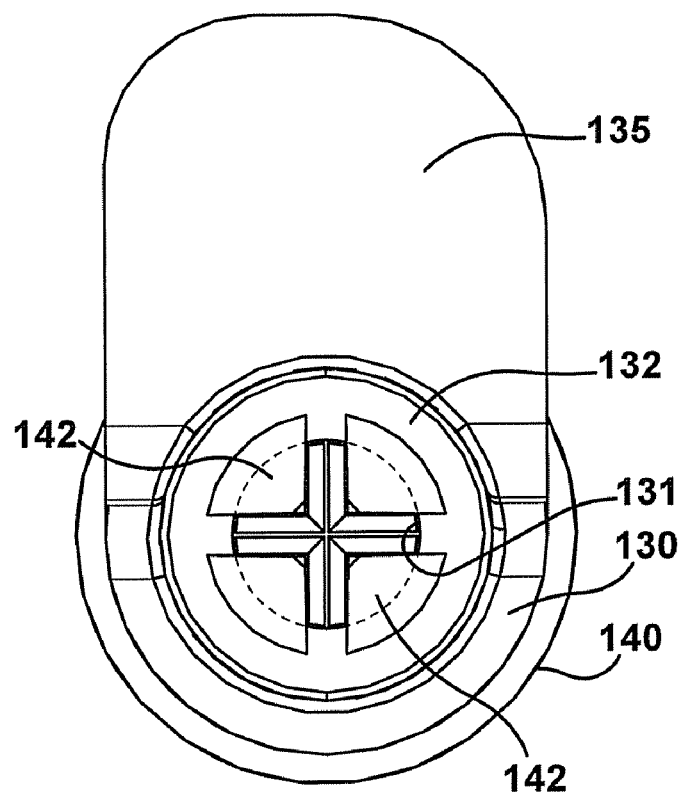
FIG. 9B illustrates a rear view of the cam and cam driver assembly of FIG. 9A.
Figure 14A:
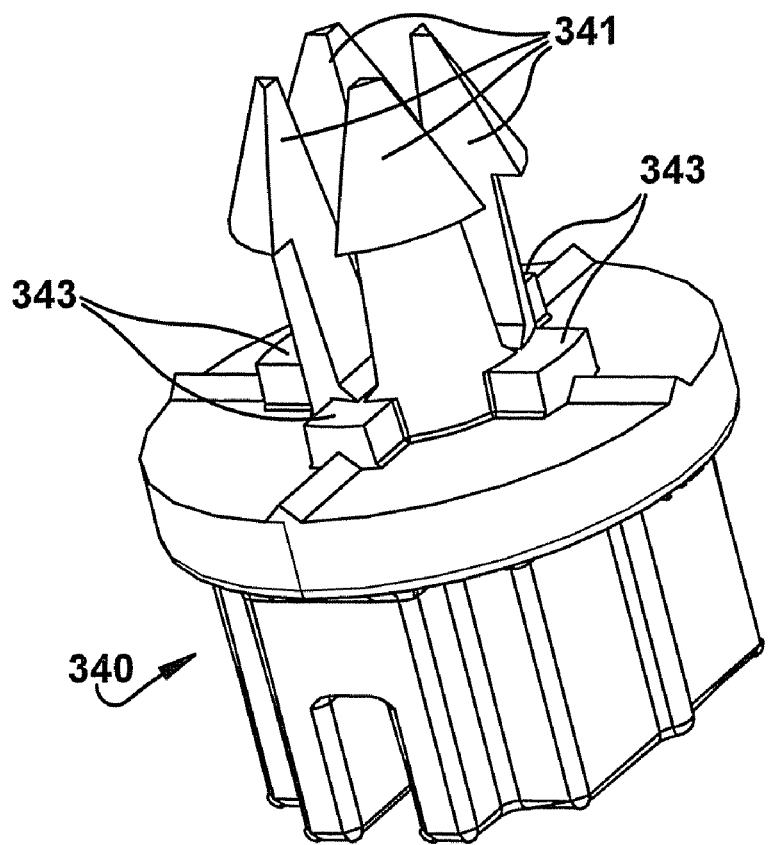
FIG. 14A illustrates a side perspective view of a cam driver.
Figure 14B:
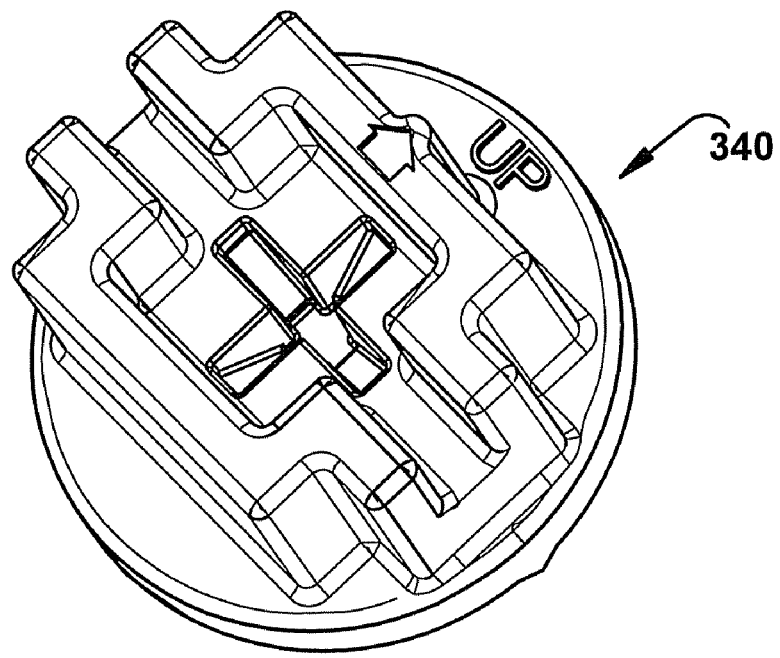
FIG. 14B illustrates a front perspective view of the cam driver of FIG. 14A.
Figure 17A:
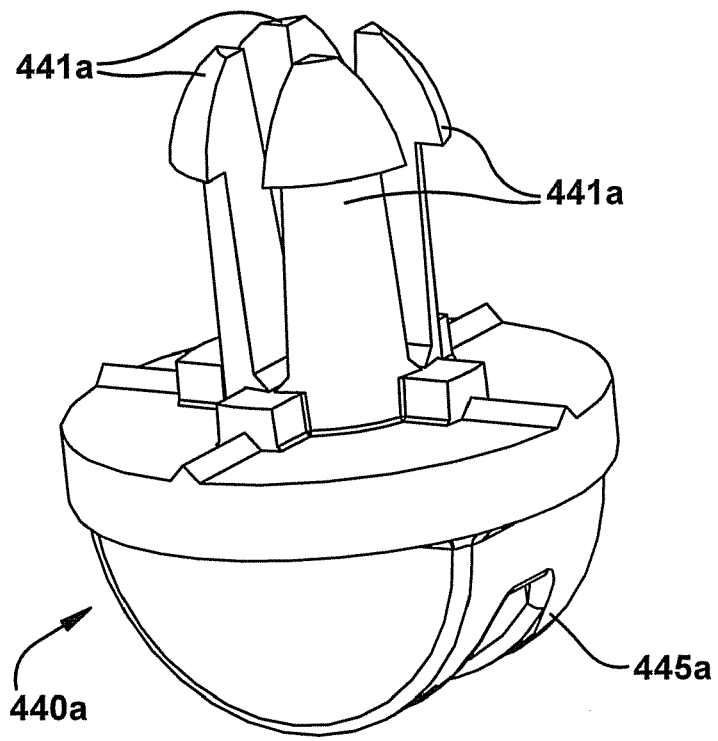
FIG. 17A illustrates a side perspective view of a cam driver having a flat, slotted user operable portion.
Figure 17B:
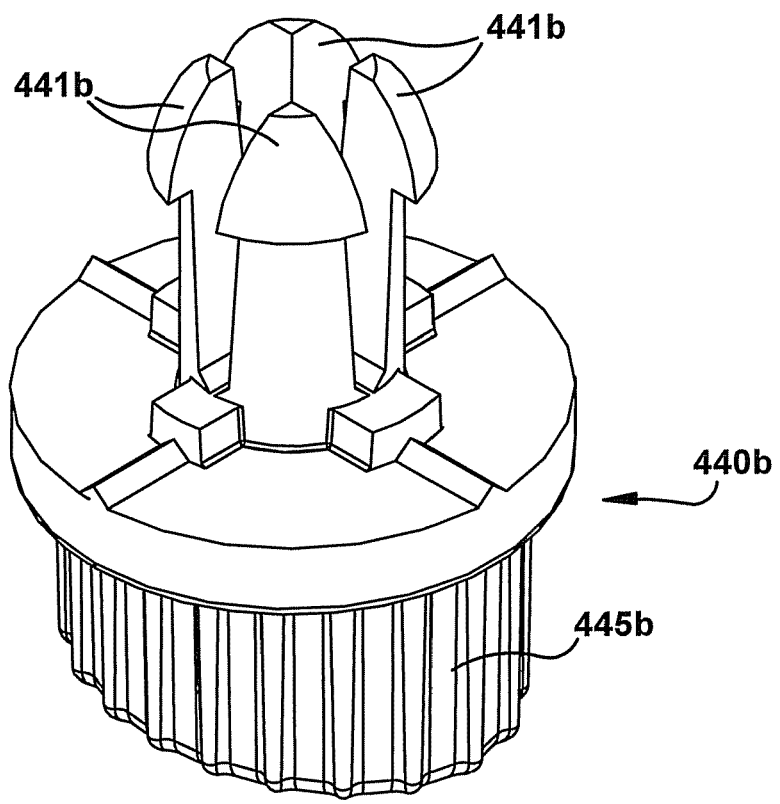
FIG. 17B illustrates a side perspective view of a cam driver having a round, knob-shaped user operable portion.

In the illustrated embodiment, a cam driver 140 is connected with the cam 130 through the bracket opening 125 for user manipulation of the cam 130. While many different configurations may be utilized to connect the cam driver 140 to the cam 130, such as, for example, adhesives, fasteners, welding, press fit engagement, heat-staking, or an integral connection, in the illustrated embodiment, as shown in FIGS. 9A and 9B, the cam driver 140 may include two or more outwardly biased flexible fingers 142 adapted to be squeezed through a central opening 131 in the cam and then snap over a shoulder 132 in the cam 130, thereby securing the cam 130 and cam driver 140 on the bracket 120. Other snap-fit arrangements are shown in FIGS. 14A, 17A, and 17B, in which four flexible fingers 341, 441a, 441b are configured to be squeezed through an opening in a cam and biased outward to secure the cam driver 340, 440a, 440b to the cam (not shown). As another example, as shown in FIGS. 15A and 15B, a cam driver 540 may include a keyed shaft 541 for insertion into a complementary shaped hole 531 of the cam 530. Attachment of the cam driver 540 to the cam 530 may be secured, for example, by heat staking, or a sealant or adhesive.

Figure 16C:
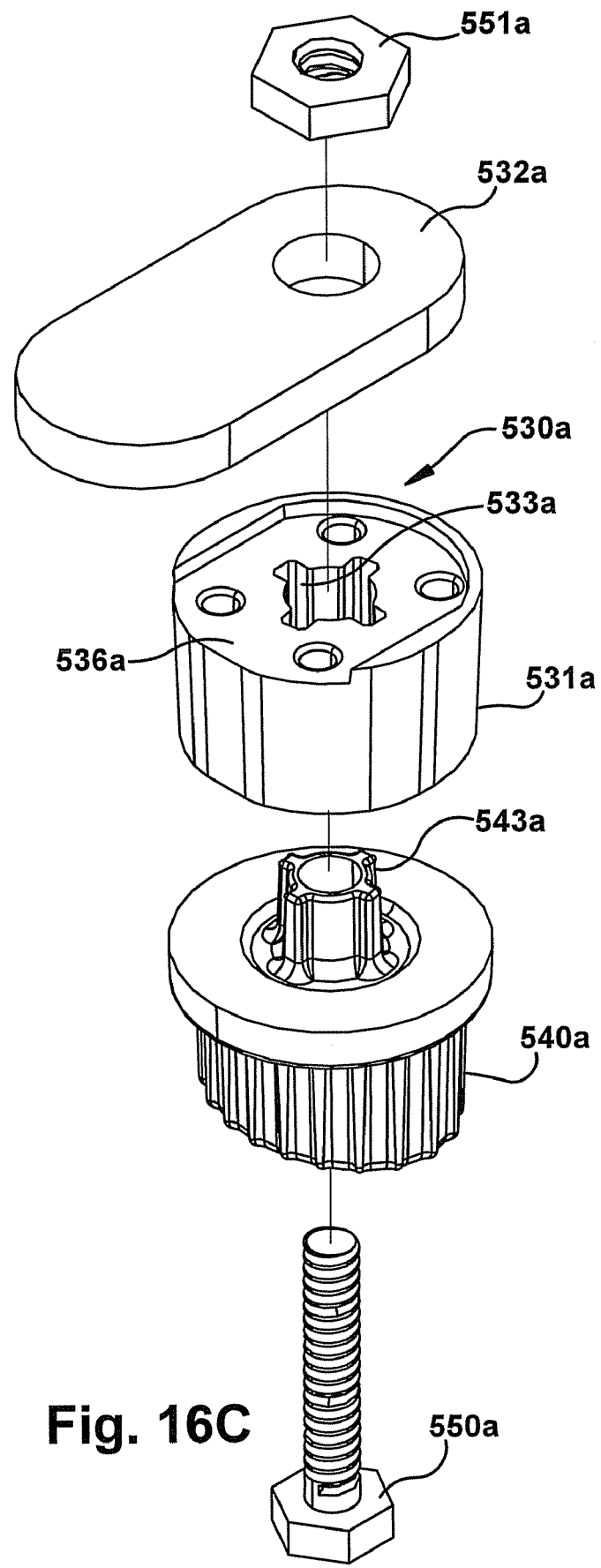
FIG. 16C illustrates an exploded perspective view of a cam body and cam plate secured to a cam driver with a fastener.

In another example, as shown in FIGS. 16A and 16B, a fastener 550 may be used to secure the cam 530 on the shaft 541. In still another embodiment, as shown in the exploded view of FIG. 16C, a cam 530a is provided as a two part assembly, with a cam body 531a and cam plate 532a secured together and to the cam driver 540a by a fastener 550a (e.g., a hex cap screw) and nut 551a. As shown, the cam driver shaft 543a and cam body hole 533a may be shaped to prevent relative rotation between the cam driver 540a and cam body 531a. Likewise, the cam plate 532a may be seated in a complementary shaped recess 536a of the cam body 531a to prevent relative rotation between the cam plate 532a and cam body 531a. By providing the cam 530a as a two piece assembly, the cam may be provided with different portions constructed of different materials (e.g., a metal cam plate and a plastic cam body).

Figure 9C:
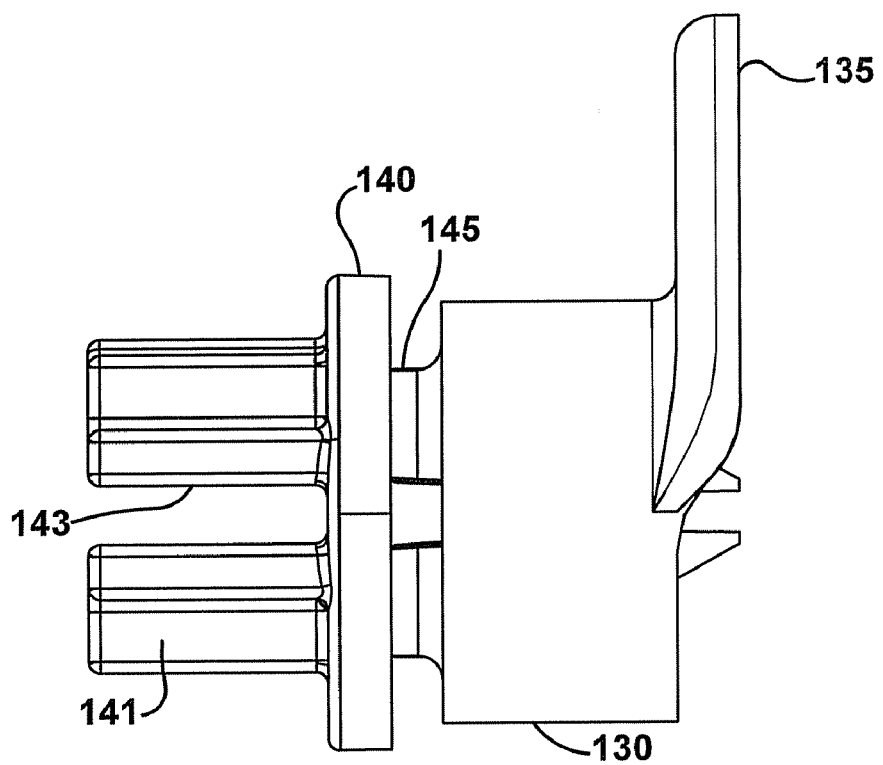
FIG. 9C illustrates a side view of the cam and cam driver assembly of FIG. 9A.
Figure 9D:
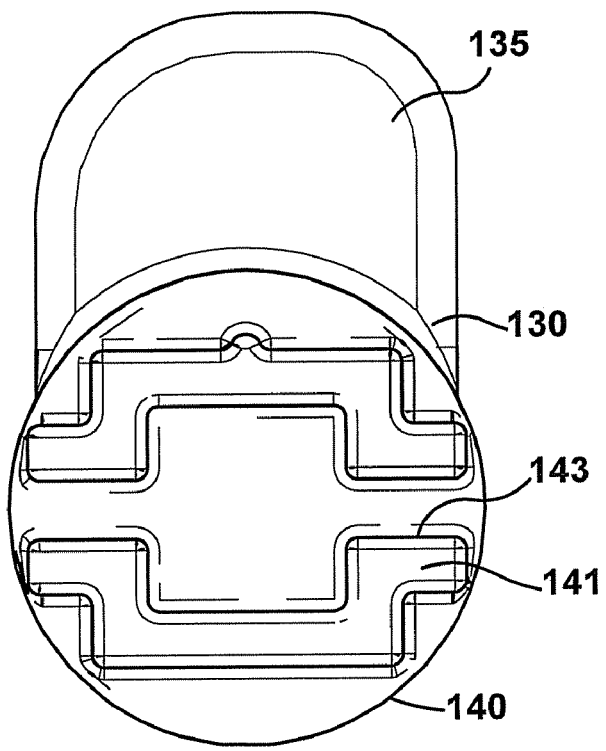
FIG. 9D illustrates a front view of the cam and cam driver assembly of FIG. 9A.
Figure 18A:
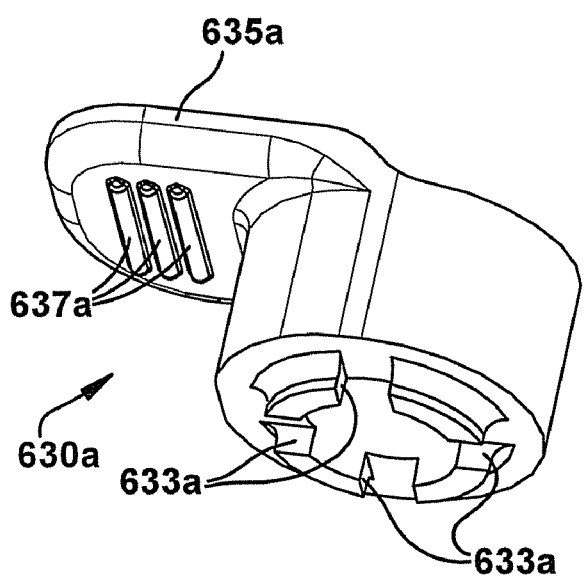
FIGS. 18A, 18B, 18C, and 18D illustrate side perspective views of cams having projections including a variety of rail member engaging surface features.
Figure 18B:
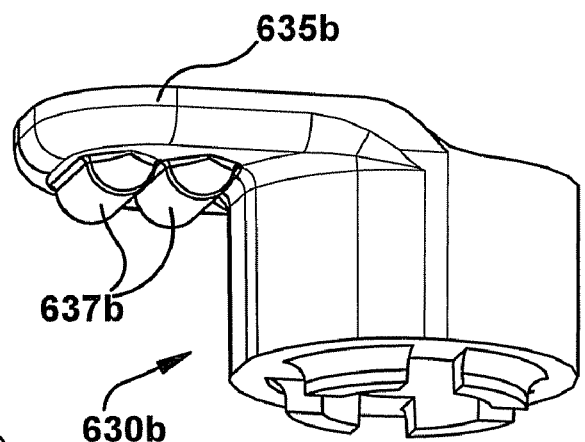
Figure 18D:
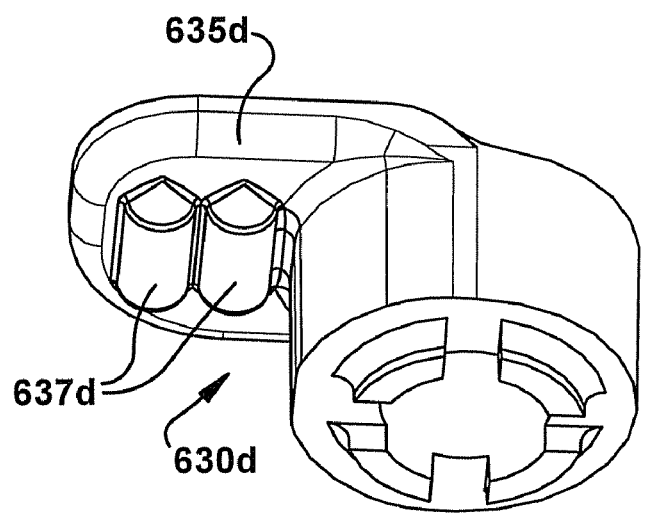
Figure 18C:
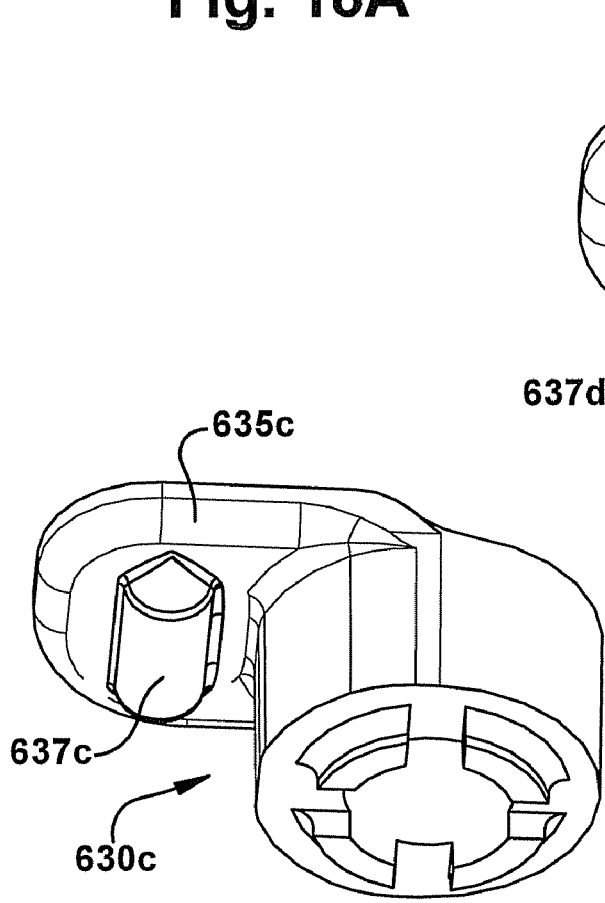

As shown in FIG. 9C, the cam 130 and cam driver 140, when assembled, define a circumferential or annular groove 145 sized to secure the cam assembly to the mounting aperture 125 in the bracket 120. In one embodiment, the groove 145 may be sized to provide a press fit with the bracket 120, such that the cam 130 and cam driver 140 are retained in a desired rotational position with respect to the bracket 120 (for example, the bracket retaining position), until an operating force is applied to the cam driver 140 by a user. In another embodiment (not shown), the undercut may be limited to a portion of the length of the slot, thereby preventing the bracket from sliding along the slot (e.g., to an end of the slot for separation from the rail member). While the cam 130 and cam driver 140 may be provided in any suitable material, in one embodiment, the cam 130 and cam driver 140 are manufactured from injection molded plastic. The cam driver and cam may include keyed or interlocking mating features to prevent rotation of the cam and cam driver with respect to each other. In one embodiment, as illustrated in FIGS. 14A and 18A, the cam driver 340 may include one or more tabs or nubs 343 configured to be received in corresponding notches 633a in the cam 630.

Figure 11A:
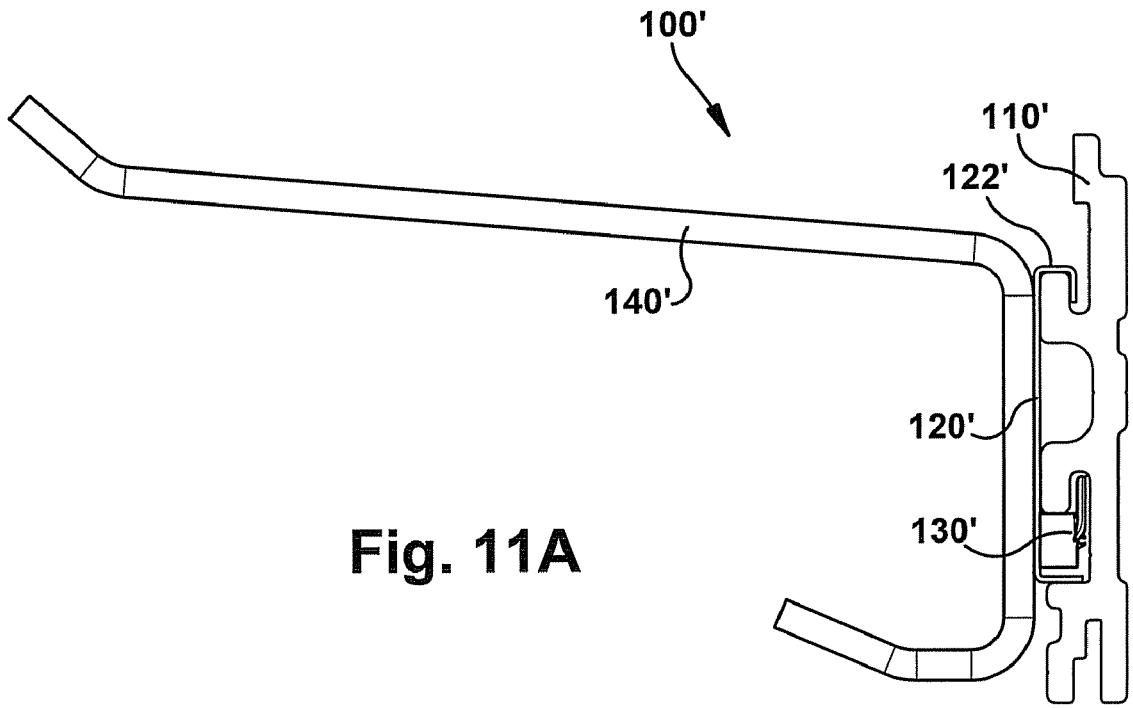
FIG. 11A illustrates a side view of another wall storage mounting arrangement.
Figure 11B:
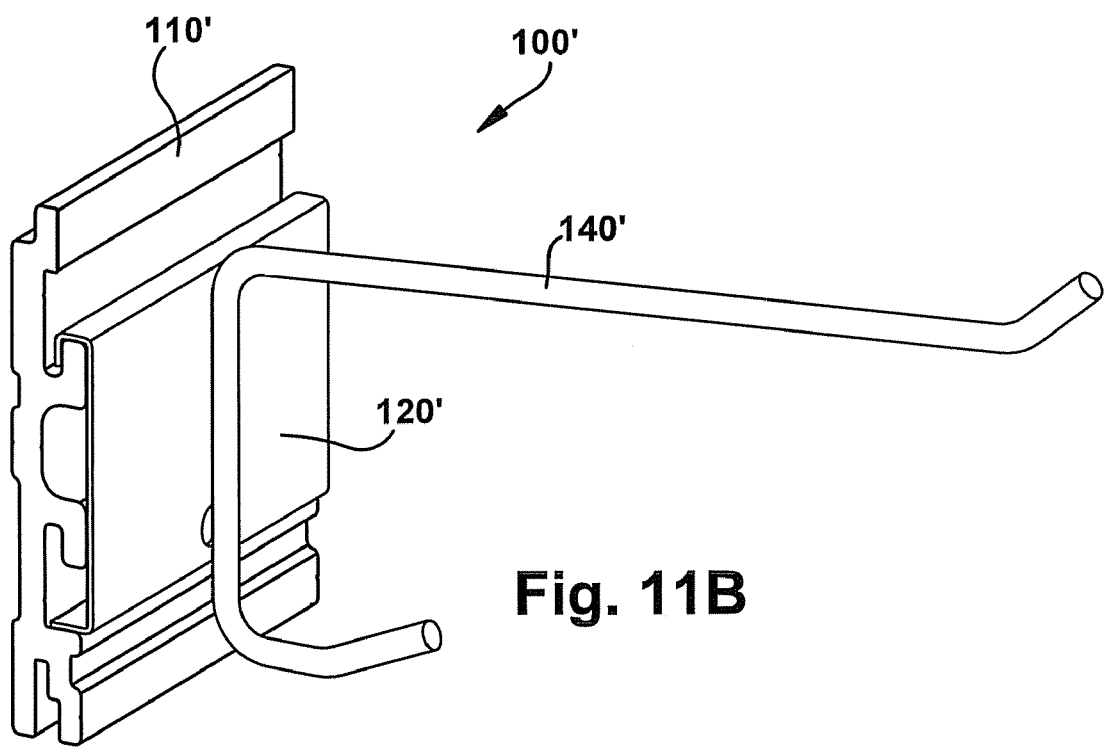
FIG. 11B illustrates a side perspective view of the wall storage mounting arrangement of FIG. 11A.

The cam driver 140 may be configured to be rotated by hand and, as shown in FIGS. 9A and 9C, may include a user graspable portion or knob 141 that a user may grasp and rotate. Additionally or alternatively, the cam driver 140 may be provided with a user graspable tool interface portion 143 configured to receive a tool (for example, a screwdriver) for rotation of the cam driver using the tool. In the illustrated embodiment, the tool interface portion 143 includes a slot sized to receive a flat-head screwdriver. Other types of cam drivers may be used. In the alternative embodiment of FIGS. 11A and 11B, a wall storage mounting arrangement 100' includes a hook or hanger 140' connected with a cam 130' through an opening in the bracket 120', such that a user may grasp and rotate the hook 140' to rotate the cam 130' from the bracket retaining position to the bracket releasing position for separation of the hook 140' and bracket 120' from the rail member 110'. Other examples of user operable cam drivers are illustrated in FIG. 17A (showing a slotted flat dial 445a) and FIG. 17B (shown a user graspable round knob 445b). In another embodiment (not shown), the cam driver may include a key-operated locking mechanism, such that a proper key must be inserted into the cam driver for rotation of the cam from the bracket retaining position to the bracket releasing position, thereby providing secure locking retention of the bracket (and the item or storage accessory mounted to the bracket).

Figures 19A, 19B:
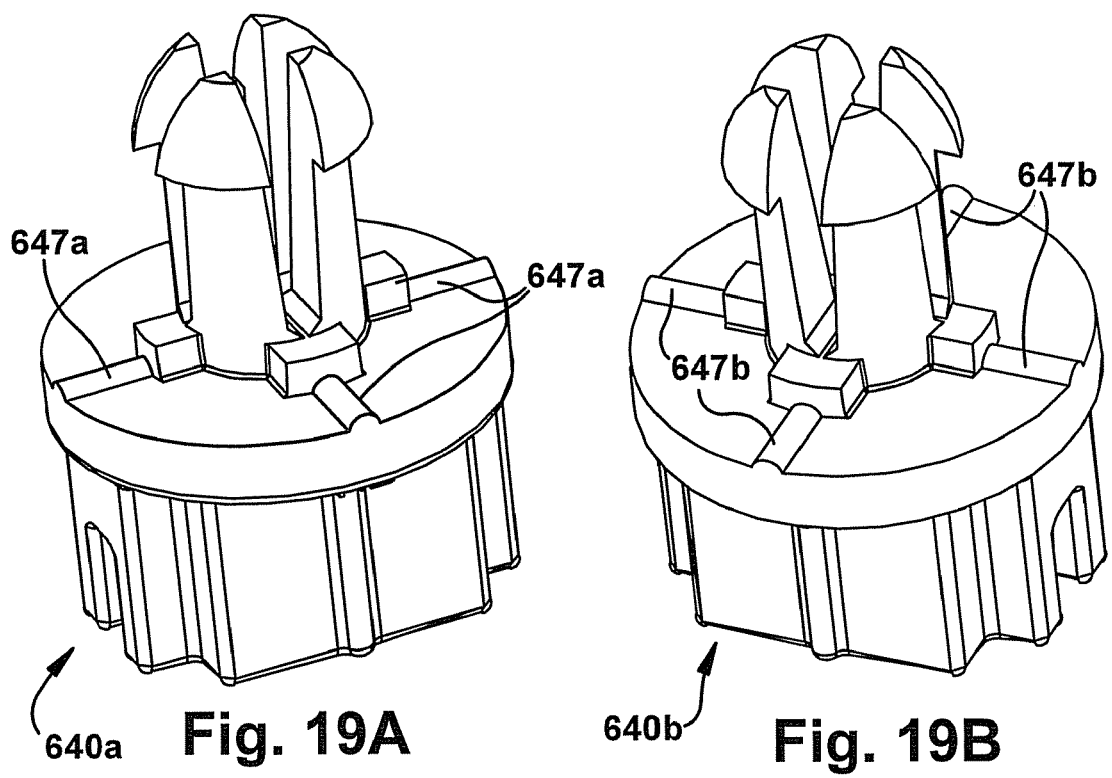
FIGS. 19A and 19B illustrate side perspective views of cam drivers having different bracket engaging surface features.
Figures 20A, 20B:
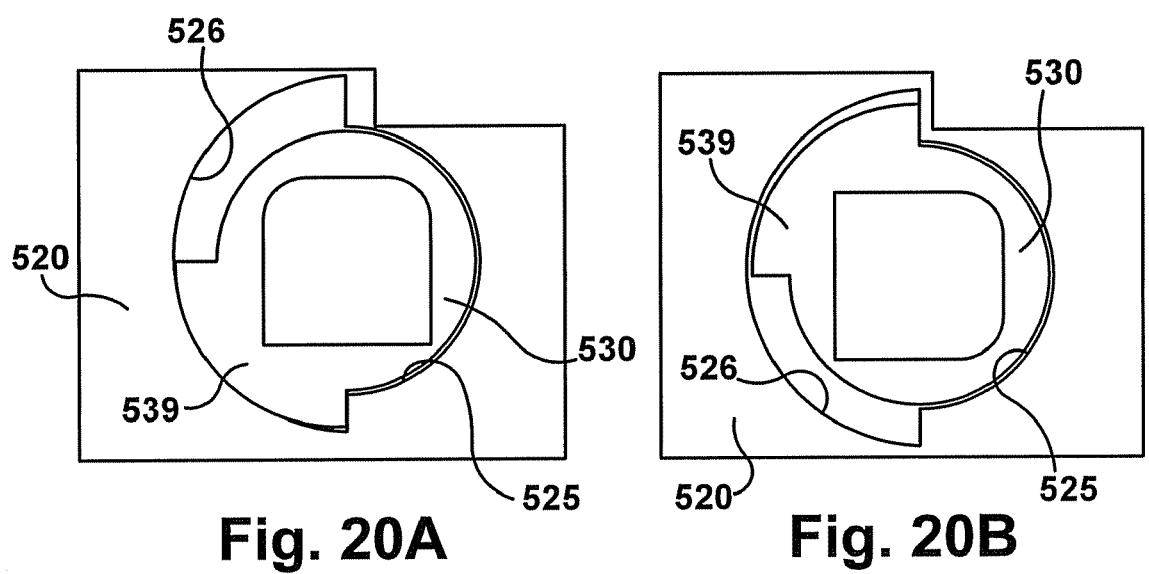
FIG. 20A illustrates a partial cross-sectional end view of a cam assembled with a bracket opening, the cam being in a rail engaging orientation.
FIG. 20B illustrates a partial cross-sectional end view of the cam and bracket opening of FIG. 17A, the cam being in a rail disengaged orientation.

To prevent a loose or uneven fit between the cam, the mounting hardware, and the slatwall, mating surfaces of one or more of these components may be adapted to eliminate gaps or account for variances in component dimensions (resulting from, for example, manufacturing, painting/coating, or component wear). In one embodiment, one or more mating surfaces may be provided with contoured surface features (such as, for example, ribs). For example, cams 630a, 630b, 630c, 630d, as shown in FIGS. 18A-18D, respectively, include a surface of the cam projection provided with one or more ribs 637a, 637b, 637c, 637d of varying shapes and sizes for tight or secure engagement between the cam projection 635a, 635b, 635c, 635d and the slot undercut 115 of the rail member 110 (see FIG. 12A). As another example (as shown in FIGS. 19A and 19B), a rear surface of a cam driver 640a, 640b may be provided with radially extending ribs 647a, 647b of varying size and shape, to eliminate any loose fit between the cam driver and the bracket 120 (see FIG. 10). Additionally, corresponding grooves or indents (not shown) may be provided in the surface of the bracket to engage the ribs, thereby facilitating proper orientation of the cam driver 640a, 640b on the bracket 120. In another embodiment, orientation of the cam (and cam driver) on the bracket may be limited by the bracket opening and a portion of the cam received in the opening. As one example, as shown in FIGS. 20A and 20B, the annular groove in the cam assembly may be provided with a quarter-circular base extension or tang portion 539 positioned to travel in a semicircular or 180° keyed portion 526 in the mounting aperture 525 during rotation of the cam 530, thereby limiting the rotation to a 90° range from secure engagement of the cam 530 from the rail member slot (FIG. 20A) to disengagement of the cam 530 from the slot (FIG. 20B). Additionally, as shown, the keyed portion 526 may be eccentric in shape, such that the tang portion 539 is loose in the cutout 526 when in the disengaged orientation, and tight against the edge of the cutout 526 when in the rail securing or engaging position, thereby maintaining the cam 530 in this rail engaging condition and resisting movement to the rail disengaging or releasing position (for example, to resist against inadvertent bumping or vibrations).

As described in the present application, a wall storage mounting arrangement may include a plurality of slatwall rail members configured to be stacked with each other to provide a slatwall panel assembly having multiple slots for mounting items or storage accessories (for example, by using the cam locking bracket described in greater detail above) at multiple vertical and horizontal locations. Additionally, larger items or storage accessories may utilize slots on multiple rail members. In one embodiment, a slatwall rail member includes a vertically extending tongue at one end for insertion into a corresponding vertically extending groove of an adjacent slatwall rail member. Additionally or alternatively, the slatwall rail member may include a vertically extending groove at one end for receiving a vertically extending tongue of an adjacent slatwall member. The rail member may, but need not, be configured to interlockingly stack with other substantially identical rail members, thereby eliminating the need for production, storage, and inventory management of rail members of different configurations.

Figure 12A:
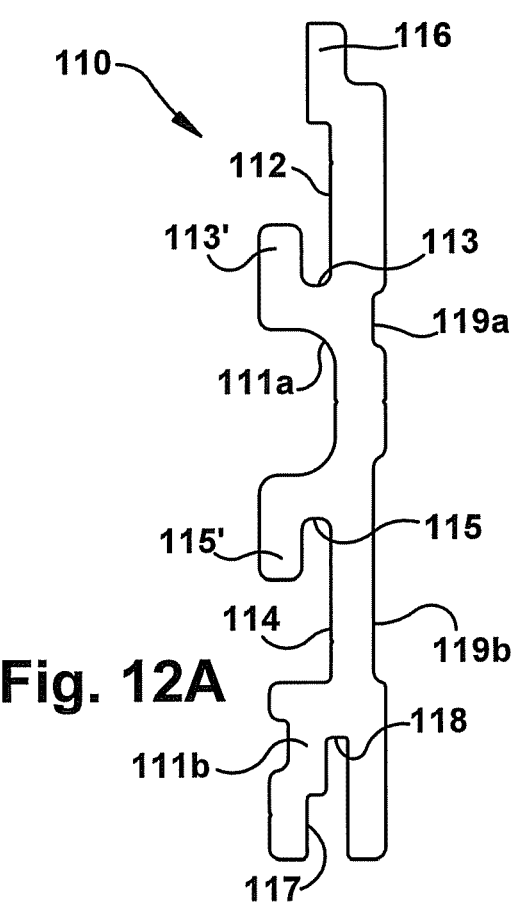
FIG. 12A illustrates a side view of a slatwall rail member.
Figure 12B:
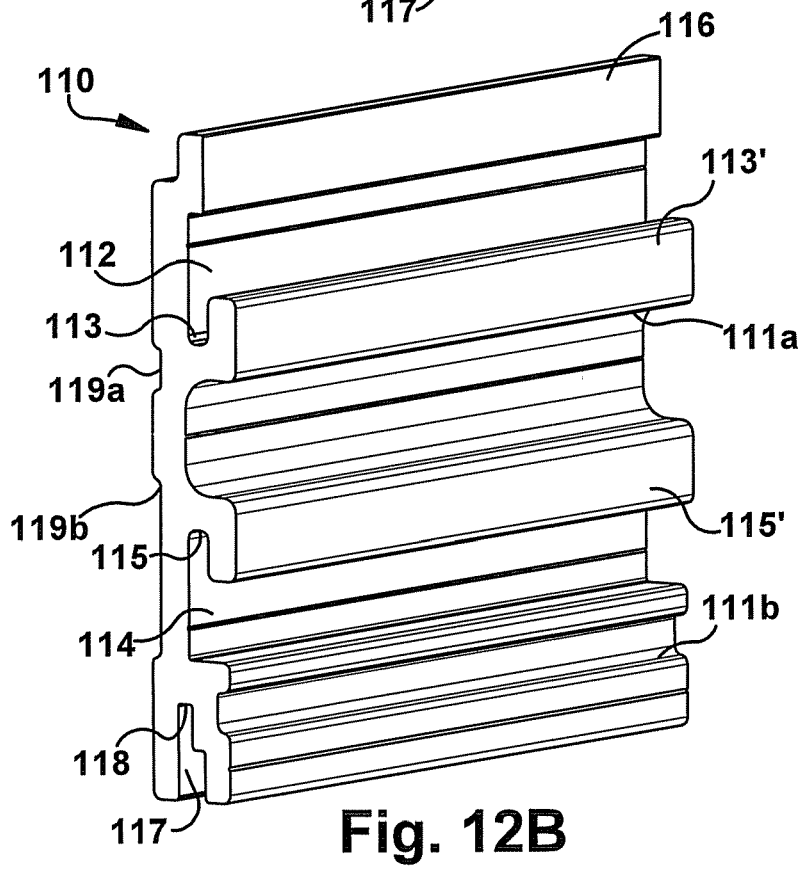
FIG. 12B illustrates a front perspective view of the slatwall rail member of FIG. 12A.
Figure 13:
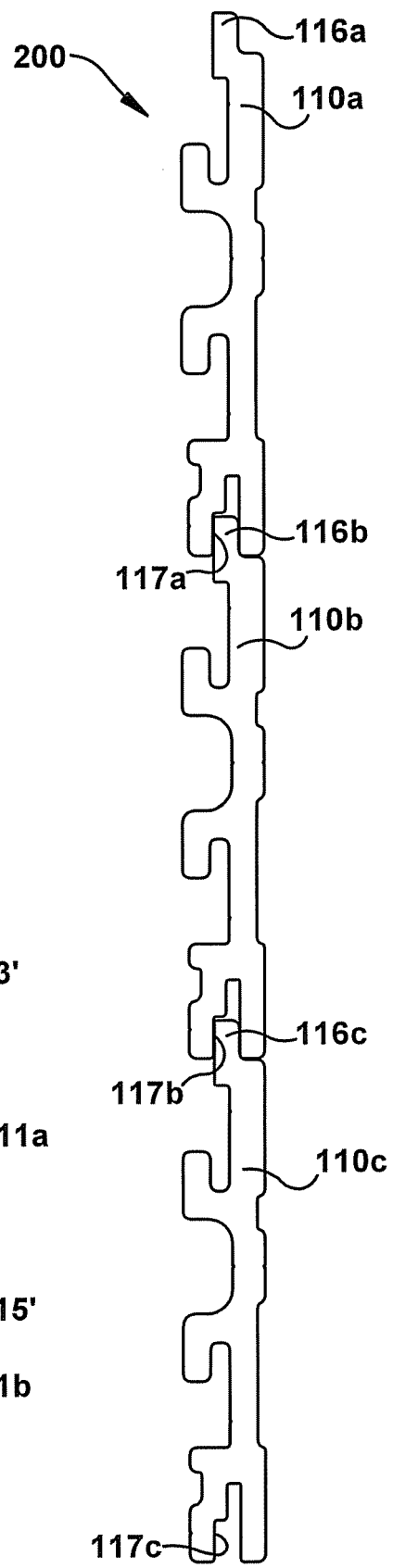
FIG. 13 illustrates a side view of a slatwall panel assembly.

FIGS. 12A and 12B illustrate an exemplary slatwall rail member 110 having first and second slots 112, 114 with corresponding first and second undercuts 113, 115, as described in greater detail above. The rail member 110 includes a vertically extending tongue 116 at a first end and a vertically extending groove 117 at a second end. The groove 117 is sized to receive a tongue of another rail member, which may be consistent with or substantially match the tongue 116 of the illustrated rail member 110. The tongue 116 is sized to be inserted in a groove of another rail member, which may be consistent with or substantially match the groove 117 of the illustrated rail member 110. FIG. 13 illustrates an exemplary slatwall panel assembly 200 including first, second, and third slatwall rail members 110a, 110b, 110c interlockingly stacked to form the panel assembly 200. As shown, the interlocking tongues 116b, 116c and grooves 117a, 117b may be sized for a press fit interlocking engagement for holding the rail members 110a, 110b, 110c together, for example, for mounting to a wall or other such surface. As shown, the bracket engaging portions (slots 112, 114) may be symmetrically shaped with respect to each other, such that the rail members 110 may be stacked either with tongues 116 facing upward and grooves 117 facing downward, as shown in FIG. 13, or with grooves 117 facing upward and tongues 116 facing downward. In the illustrated embodiment, the slots 112, 114 are substantially mirror image L-shapes in cross section, to accommodate, for example, a downward oriented J-shaped retaining portion 122 of a bracket 120 and an upward oriented movable retaining member 130 assembled with the bracket 120, as shown in the embodiment of FIGS. 8A and 8B.

According to an inventive aspect of the present application, a rail member configured to interlockingly stack with similar or identical rail members may additionally be configured to stack with a panel, board, or other such component that is dimensionally different from the rail member. As shown in FIGS. 12A and 12B, the groove 117 may include a further extension or recess 118 sized to receive a portion of a differently dimensioned interlocking member (e.g., a significantly thinner interlocking member). As one example, a groove recess 118 may be sized to closely receive an end portion of a conventional peg board (not shown) or other such panel. For example, the groove recess 118 may be approximately ¼" thick to receive a ¼" thick peg board, or approximately ⅛" thick to receive a ⅛" thick peg board.

A slatwall panel or rail member, such as, for example, the exemplary rail member 110 of FIGS. 12A and 12B, may be affixed to a wall by fastening the rail member directly to the wall. For example, one or more mounting holes may be drilled into the rail member, with the mounting holes being sized to receive fasteners, such as studs or mounting screws. To prevent splitting of the rail member, or other damage to the endmost portion of the rail member, it may be desirable to avoid drilling or cutting into the endmost portions of the rail member. While a user may instead drill inward of this endmost portion, rail members sized such that the end portions align with wall studs (often spaced about 24 inches apart) may be difficult to securely fasten to a wall at the ends without drilling into these endmost portions. As such, according to an inventive aspect of the present application, a wall mount member may be provided for assembly with an endmost portion of a rail member, with the wall mount member including a wall mounting arrangement, such as, for example, mounting holes for fasteners.

Figure 21A:
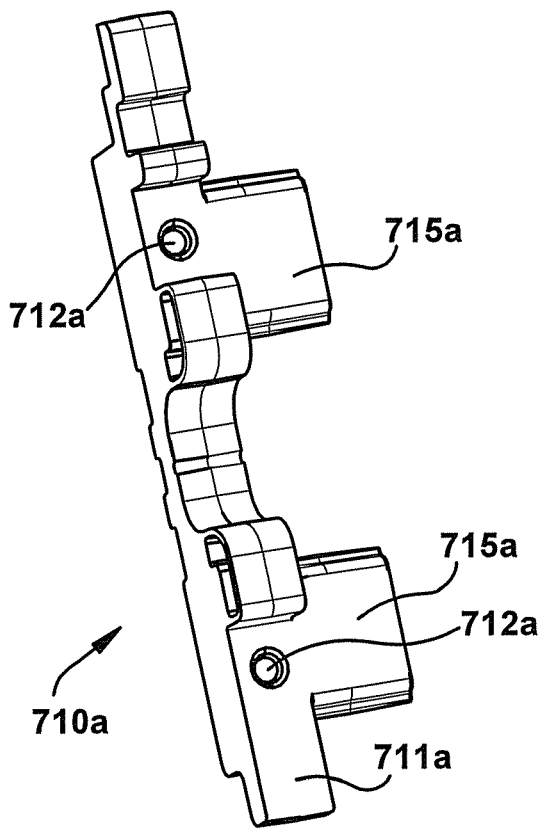
FIG. 21A illustrates a perspective view of a left wall mount member for a slatwall rail member.
Figure 21B:
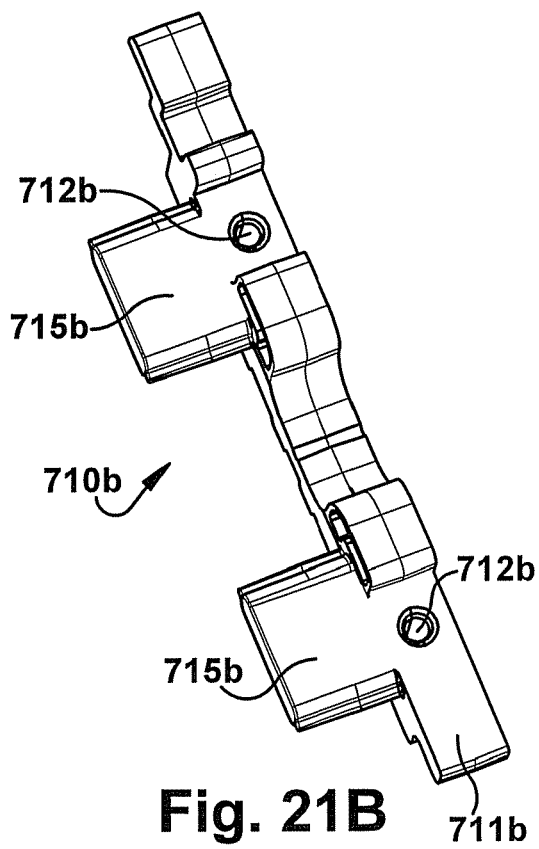
FIG. 21B illustrates a perspective view of a right wall mount member for a slatwall rail member.

Many different configurations may be used to attach a wall mount member to an endmost portion of a rail member. In one embodiment, a wall mount member may include one or more laterally extending tabs configured to be received in corresponding slots in the rail member, such that the wall mount member may be slid into interlocking engagement with the rail member for attachment of the rail member to a wall. FIGS. 21A and 21B illustrate exemplary left and right wall mount members 710a, 710b, each having a mountable portion 711a, 711b having mounting holes 712a, 712b, and tab portions 715a, 715b sized to be received in corresponding slots in a rail member (such as, for example, first and second slots 112, 114 of the rail member 110 of FIGS. 12A and 12B). The tab portions 715a, 715b may further serve to prevent slot-mounted hardware or accessories (such as, for example, the hook 140' and bracket 120' of FIGS. 11A and 11B) from sliding off of the rail member. While the mountable portion may be provided in many different shapes and sizes, in one embodiment (as illustrated), the mountable portion may be provided with a profile that at least partially (and preferably substantially) matches a profile of the endmost portion of the rail member, to provide a flush appearance with the rail member. As a result, a rail member may (but need not) be provided with different wall mount members 710a, 710b for the left and right endmost portions of the rail member, as shown in the illustrated embodiment.

Figure 21C:
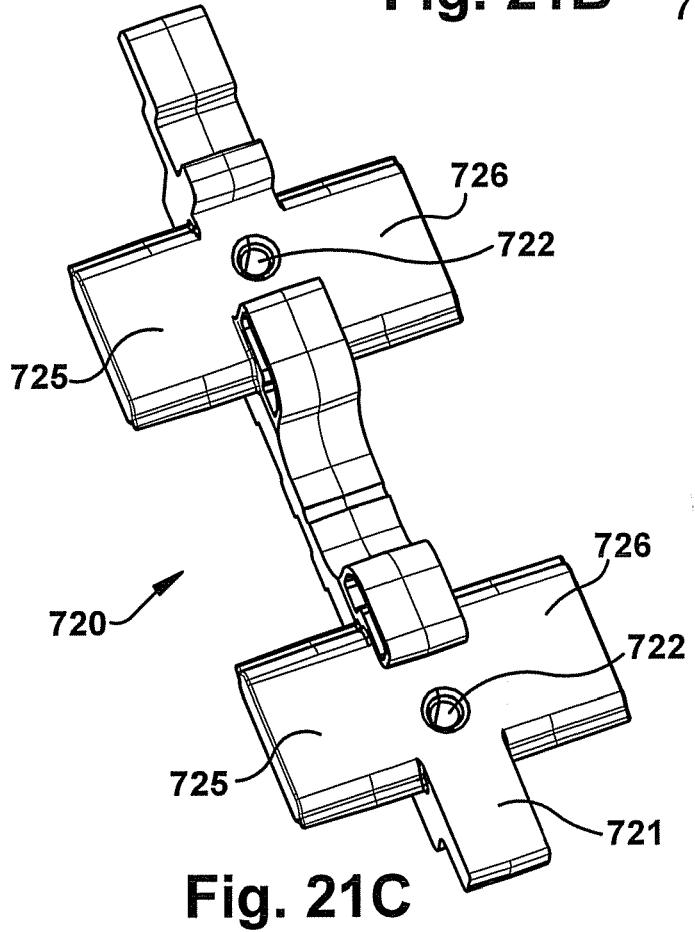
FIG. 21C illustrates a perspective view of a joining member for slatwall rail members.
Figure 21D:
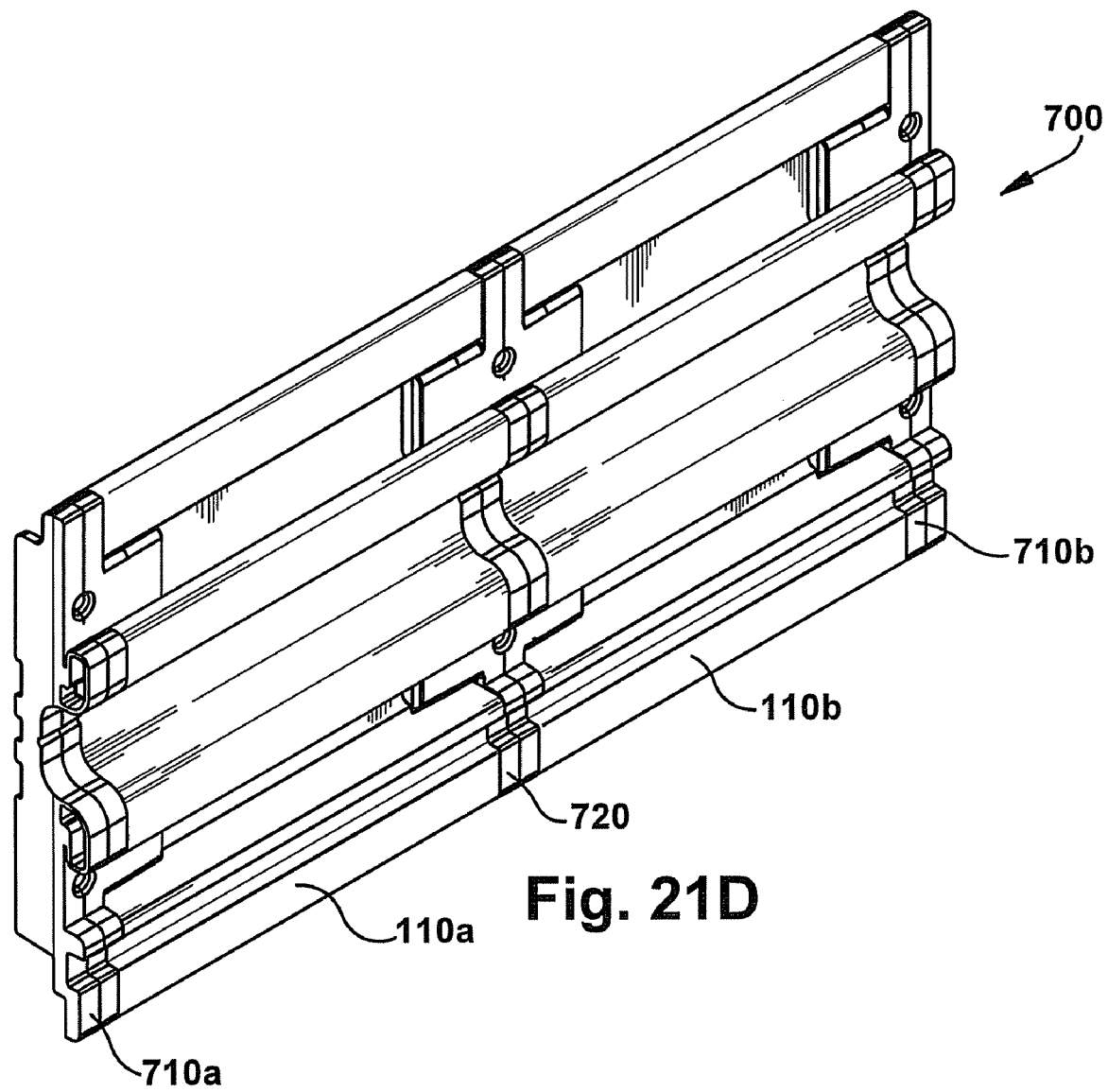
FIG. 21D illustrates a perspective view of first and second rail members assembled with left and right wall mount members and a joining member.

According to another inventive aspect of the present application, a mounting member may be configured to function as a rail joining member for aligning and joining two rail members to be mounted to a wall end-to-end. This joining member may, but need not, include a mountable portion for securing the joined rail members to a wall. Many different configurations may be used to align and join rail members in an end-to-end configuration. In one embodiment, a joining member may include opposed laterally extending tab portions configured to be received in corresponding slots in first and second rail members, such that the joining member may be slid into interlocking engagement with the first and second rail members for joining and/or aligning the first and second rail members. FIG. 21C illustrates an exemplary joining member 720 having a central portion 721 and opposed tongue portions 725, 726 sized to be received in corresponding slots in first and second rail members (such as, for example, first and second slots 112, 114 of the rail member 110 of FIGS. 12A and 12B). As shown, the central portion 721 may, but need not, be provided with one or more mounting features, such as, for example, mounting holes 722 for receiving fasteners, to secure the joining member (and with it, the first and second rail members) to a wall. While the central portion 721 may be provided in many different shapes and sizes, in one embodiment (as illustrated), the mountable portion may be provided with a profile that at least partially (and preferably substantially) matches a profile of the endmost portions of the first and second rail members, to provide a flush appearance with the rail members. FIG. 21D illustrates an exemplary slatwall assembly 700 including first and second rail members 110a, 110b assembled with left and right wall mount members 710a, 710b and joined together by joining member 720.

According to another aspect of the present application, one or more cap members may be provided to cover an endmost portion of a rail member, a wall mount member, a joining member, or some other portion of the wall mount arrangement. In one embodiment, a cap member may be configured to accommodate stacking of two or more rail members, for example, as shown in (and described with reference to) the panel assembly 200 of FIG. 13. FIGS. 22A, 22B, 22C, and 22D illustrate exemplary left and right end cap members 830a, 830b, configured for use with endmost portions of the rail members 110 of FIGS. 12A and 12B. Each end cap member 830a, 830b includes a narrowed down upper portion 831a, 831b sized to fit around the vertically extending tongue 116 of a rail member 110, and sized to be received in a corresponding groove 117 of an adjacent stacked rail member 110 (see FIGS. 12A and 12B). Each end cap member 830a, 830b further includes a lower notch portion 832a, 832b configured to align with the groove 117 of the rail member 110 for receiving the tongue 116 of an adjacent stacked rail member 110, and/or the upper narrowed portion 831a, 831b of a cap member 830a, 830b assembled with the adjacent rail member 110.

Figure 22E:
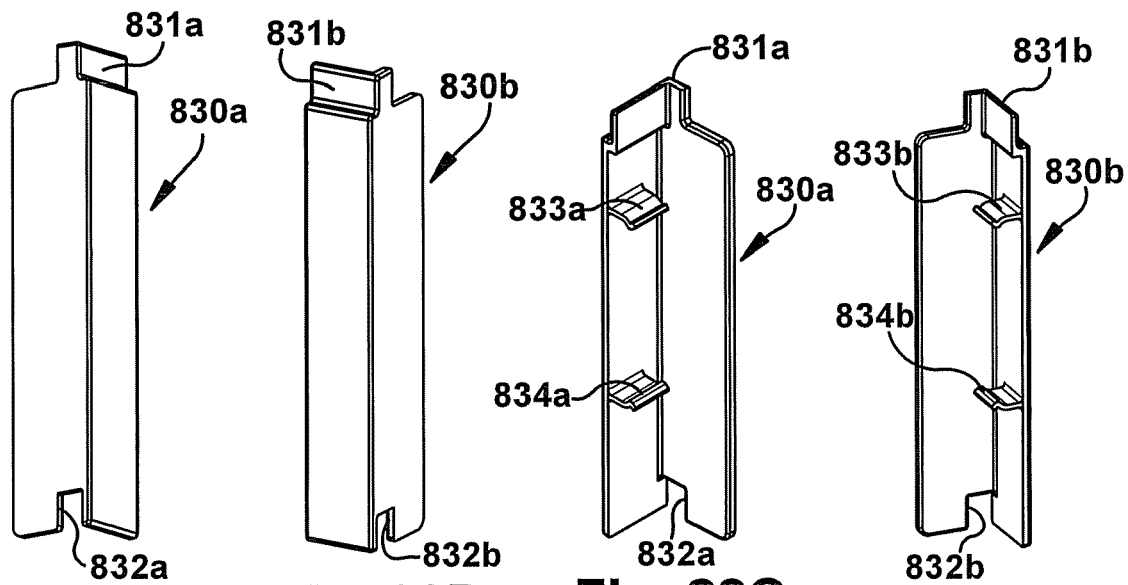
FIG. 22E illustrates a perspective view of a rail member assembled with left and right cap members.
Figure 22E:
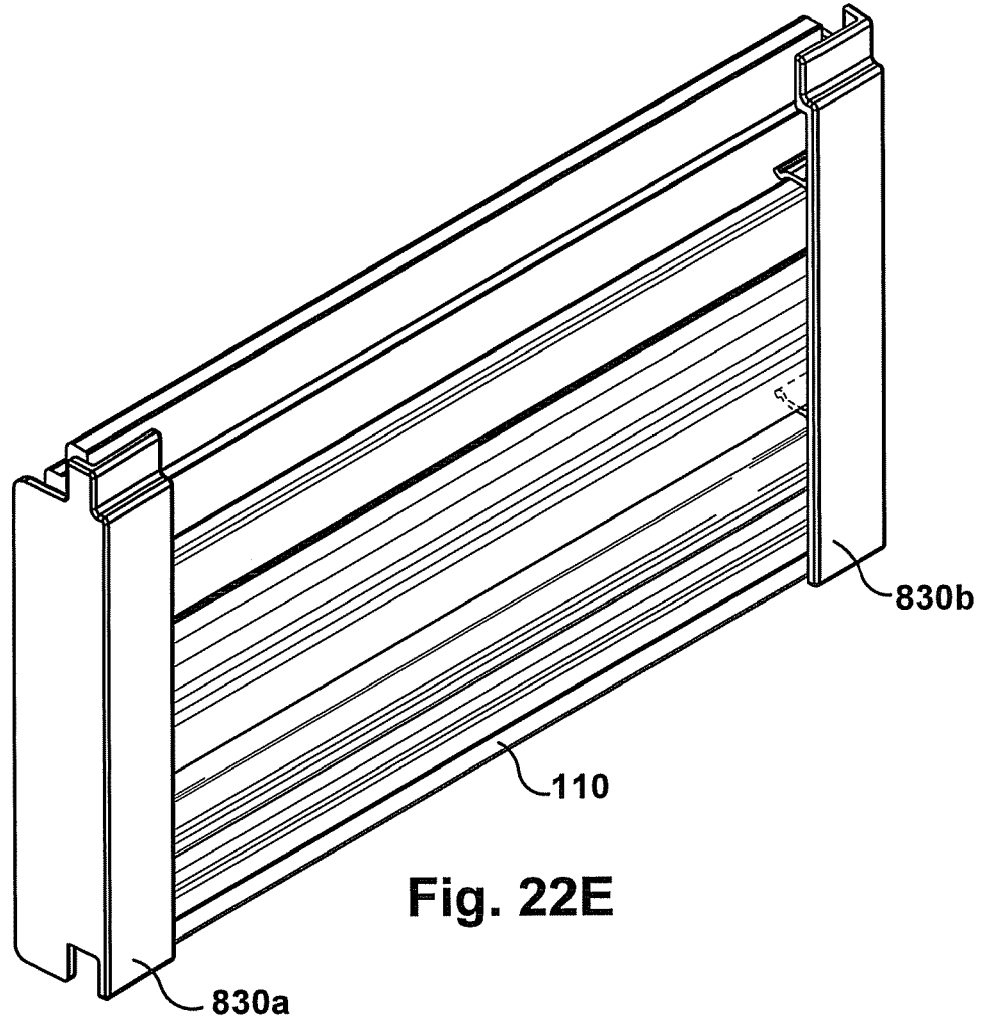

While many different configurations may be used to affix a cap member to an endmost portion of a rail member, in one embodiment, a cap member may include one or more inwardly extending flexible prongs configured to snap over a portion of the rail member, such as, for example, an overhang portion defining an undercut in a slot of the rail member. As shown in FIGS. 22C and 22D, the exemplary end cap members 830a, 830b include inwardly extending flexible prongs 833a, 834a, 833b, 834b configured to snap onto overhang portions 113', 115' of the rail member 110 (FIGS. 12A and 12B). FIG. 22E illustrates an exemplary rail member 110 assembled with left and right end cap members 830a, 830b.

Figure 23A:
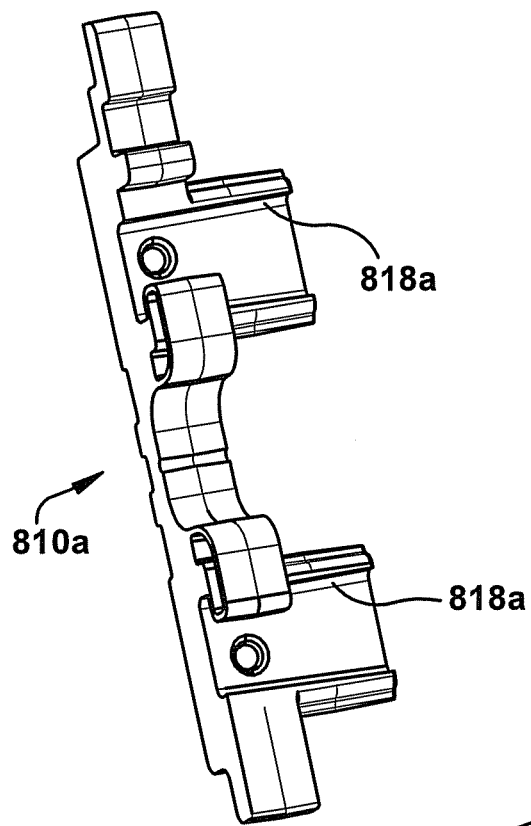
FIG. 23A illustrates a perspective view of a left wall mount member adapted for assembly with a cap member.
Figures 23B, 23C:
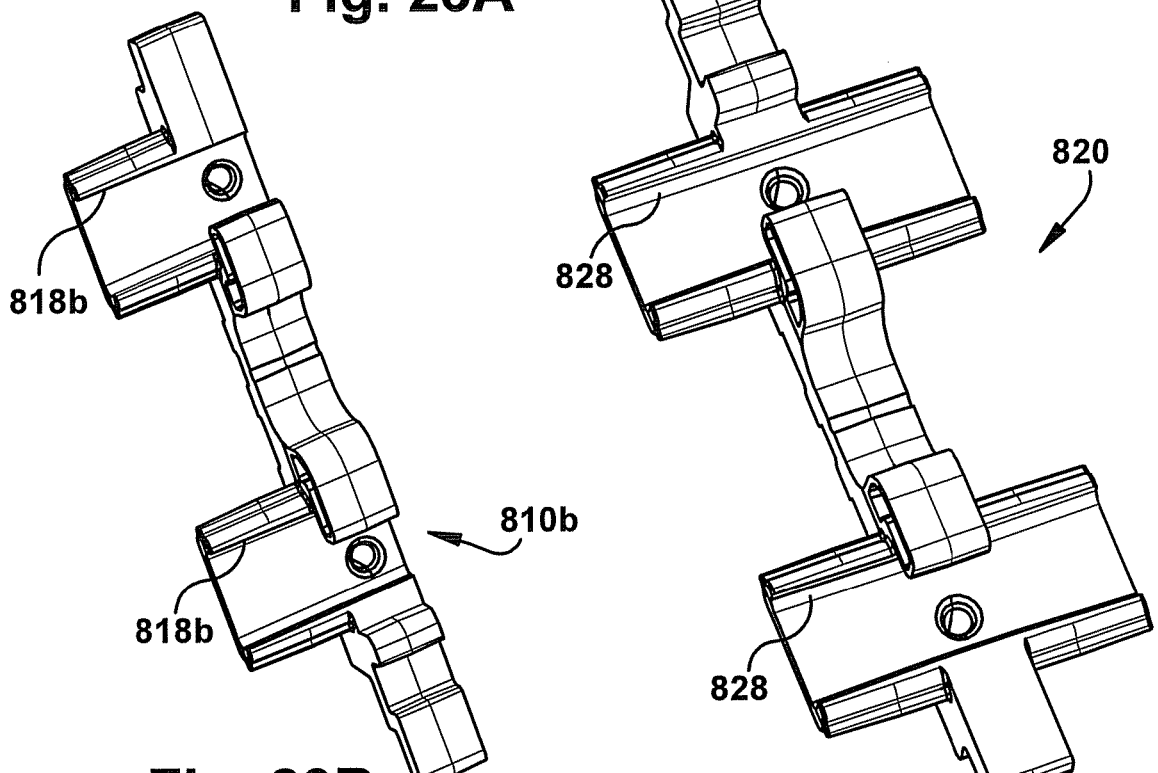
FIG. 23B illustrates a perspective view of a right wall mount member adapted for assembly with a cap member.
FIG. 23C illustrates a perspective view of a joining member adapted for assembly with a cap member.

According to another inventive aspect of the present application, a wall mount member or joining member, as described herein, may be configured to receive a cap member, such as the cap members 830a, 830b of FIGS. 22A-22D. In one embodiment, a wall mount member or joining member may include a tab portion having an outward facing recess, the recess being sized and shaped to accommodate a flexible prong of a cap member. FIGS. 23A, 23B, and 23C illustrate a left wall mount member 810a, a right wall mount member 810b, and a joining member 820, respectively, having tongue recesses 818a, 818b, 828 configured to accommodate flexible prongs of a cap member (such as, for example, the flexible prongs 833a, 834a, 833b, 834b of the cap members 830a, 830b of FIGS. 22A-22D) when the cap member is assembled with the wall mount member 810a, 810b or joining member 820. FIGS. 23D and 23E illustrate a cap member 830a assembled with a left wall mount member 810a.

While the rail member 110 may be constructed in any suitable material (for example, various metals and plastics), in one embodiment, the rail member 110 may be constructed from extruded polyvinyl chloride (PVC) material. To preserve material used to construct the rail member 110 while maintaining adequate strength of the rail component, recesses (shown, for example, at 111a, 111b, 119a, 119b) may be formed in the front and rear sides of the rail member 110.

Other inventive features may be provided with a rail member in accordance with the present application. For example, a rail member may be configured to include a hollow portion or recess for receiving electrical wiring (not shown), for example, to supply power to electrical devices mounted to or stored on the rail member. As one example, rechargeable electrical hand tools mounted to or stored on the rail member may be connected to electrical wiring provided in the rail member, so that the hand tools may remain fully charged and ready for use. The hollow or recess configured to receive electrical wiring may be large enough to allow an end user to install electrical wiring (e.g., an extension cord) before or after the rail member is mounted to a wall. As another example, the rail member may be formed around the electrical wiring, or the electrical wiring may be pre-installed in a hollow portion (e.g., a hole or channel) of the rail member, such that an end user may obtain a rail member with integrated electrical wiring.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, circuits, devices and components, software, hardware, control logic, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure; however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention. Descriptions of exemplary methods or processes are not limited to inclusion of all steps as being required in all cases, nor is the order that the steps are presented to be construed as required or necessary unless expressly so stated.

We claim:

1. A slatwall mounting system comprising:
   a rail member comprising longitudinally extending upper and lower edges, a first side for engaging a wall surface, and a second side having a longitudinally extending upper slot portion including a downward extending undercut forming an inverted L-shape in cross-section and a longitudinally extending lower slot portion including an upward extending undercut forming an L-shape in cross-section; and a mounting arrangement comprising:

a bracket member having a front panel and a downward oriented hook portion extending rearward of the front panel along an upper edge of the front panel for engagement with the upper slot portion of the rail member, and a mounting aperture extending through the front panel; and a cam assembly comprising a mounting cam assembled with a user graspable cam driver, the cam including a cam body received in a front opening of the lower slot portion and a projection extending from the cam body for engagement with the upward extending undercut in a slatwall securing position of the mounting cam, the cam body and cam driver being joined to form a neck portion defining an outer circumferential annular groove spaced apart from the projection and received within the mounting aperture thereby securing the cam assembly to the bracket member, the mounting cam being rotatable between the slatwall securing position for mounting engagement with the lower slot of the rail member, and a slatwall releasing position in response to user manipulation of the cam driver.

2. The slatwall mounting system of claim 1, wherein the rail member further comprises a longitudinally extending tongue portion disposed on one of the upper and lower edges, and a longitudinally extending groove portion disposed on the other of the upper and lower edges, the groove portion being sized to receive an interlocking member substantially matching the tongue portion of the rail member.

3. The slatwall mounting system of claim 2, wherein the rail member further includes a recessed portion extending inward from the groove portion to receive an interlocking member thinner in cross section than the tongue portion.

4. The slatwall mounting system of claim 1, wherein the bracket member further comprises a lower leg portion extending rearward of the front panel along a lower edge of the front panel.

* * * * *